US012581551B2

(12) United States Patent
Back et al.

(10) Patent No.: US 12,581,551 B2
(45) Date of Patent: Mar. 17, 2026

(54) OPERATION METHOD AND APPARATUS RELATED TO RRC CONNECTION AND TIMER OF A REMOTE UE IN A WIRELESS COMMUNICATION SYSTEM

(71) Applicant: LG ELECTRONICS INC., Seoul (KR)

(72) Inventors: Seoyoung Back, Seoul (KR); Giwon Park, Seoul (KR); Seungmin Lee, Seoul (KR); Jongwoo Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 536 days.

(21) Appl. No.: 17/875,363

(22) Filed: Jul. 27, 2022

(65) Prior Publication Data

US 2023/0072842 A1      Mar. 9, 2023

Related U.S. Application Data

(60) Provisional application No. 63/229,541, filed on Aug. 5, 2021.

(30) Foreign Application Priority Data

Jul. 28, 2021     (KR) ......................... 10-2021-0099340

(51) Int. Cl.
*H04W 76/14*          (2018.01)
*H04W 76/18*          (2018.01)
(Continued)

(52) U.S. Cl.
CPC ........... *H04W 76/14* (2018.02); *H04W 76/18* (2018.02); *H04W 36/037* (2023.05); *H04W 88/04* (2013.01)

(58) Field of Classification Search
CPC ... H04W 76/14; H04W 76/18; H04W 36/037; H04W 88/04
See application file for complete search history.

(56) References Cited

U.S. PATENT DOCUMENTS

| | | | | |
|---|---|---|---|---|
| 2017/0188403 A1* | 6/2017 | Jung | ..................... | H04W 72/02 |
| 2024/0056954 A1* | 2/2024 | Xu | ........................ | H04W 76/20 |

(Continued)

FOREIGN PATENT DOCUMENTS

| | | | | |
|---|---|---|---|---|
| CN | 117204111 A | * 12/2023 | ............ | H04W 76/18 |
| CN | 117296382 A | * 12/2023 | ............ | H04W 40/22 |

OTHER PUBLICATIONS

3GPP TS 38.331 V15.14.0, 3rd Generation Partnership Project; Technical Specification Group Radio Access Network; NR; Radio Resource Control (RRC) protocol specification, (Jun. 2021), p. 43, Section 5.3.3.7 (Year: 2021).*

*Primary Examiner* — Ayman A Abaza
*Assistant Examiner* — Benjamin T. Ranew
(74) *Attorney, Agent, or Firm* — LEE, HONG, DEGERMAN, KANG & WAIMEY

(57)                ABSTRACT

An embodiment relates to an operation method of a remote user equipment (UE) in a wireless communication system, including selecting a relay UE by the remote UE, establishing PC5 connection with the relay UE by the remote UE, and transmitting a message related to Radio Resource Control (RRC) connection to the relay UE by the remote UE, and in this case, the remote UE initiates one or more timers related to RRC connection with a base station (BS), and the one or more timers are different from a first timer used when the remote UE performs a direct RRC connection procedure with the BS.

10 Claims, 22 Drawing Sheets

(51) Int. Cl.
_H04W 88/04_ (2009.01)
_H04W 36/00_ (2009.01)

(56) References Cited

U.S. PATENT DOCUMENTS

2024/0080658 A1* 3/2024 Chen ....................... H04W 8/22
2024/0244696 A1* 7/2024 Yang .................... H04W 76/27

* cited by examiner

PU5-U (a)

PU5-C (b)

(a)

(b)

(a)                (b)

selecting a relay UE — S1201 establishing PC5 connection with the relay UE — S1202 transmitting a message related to RRC connection to the relay UE — S1203

Figure 19:
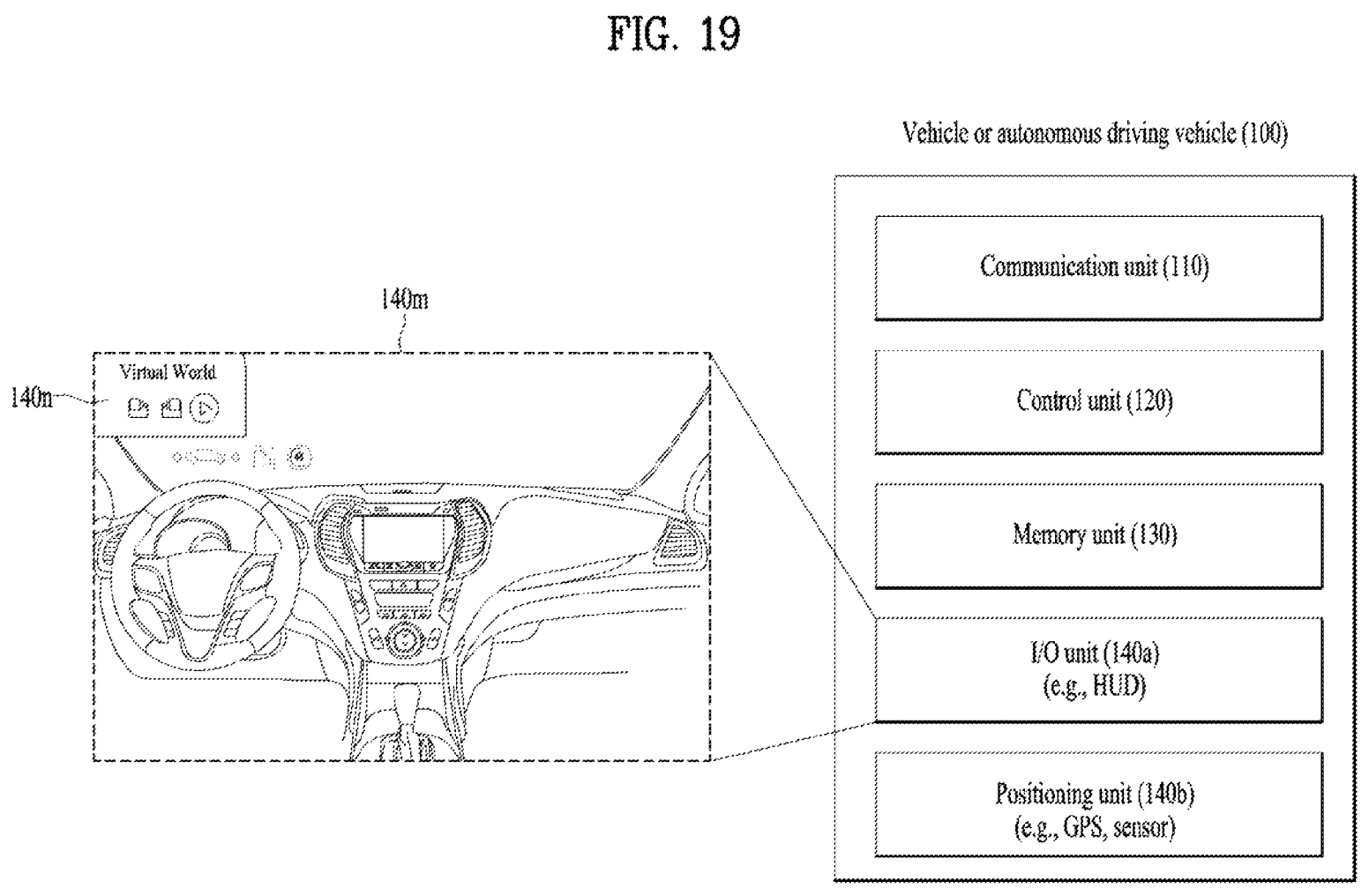

Vehicle or autonomous driving vehicle (100)

Communication unit (110)

Control unit (120)

Memory unit (130)

I/O unit (140a)
(e.g., HUD)

Positioning unit (140b)
(e.g., GPS, sensor)

140m

140m

Virtual World

OPERATION METHOD AND APPARATUS RELATED TO RRC CONNECTION AND TIMER OF A REMOTE UE IN A WIRELESS COMMUNICATION SYSTEM

CROSS REFERENCE TO RELATED APPLICATION(S)

Pursuant to 35 U.S.C. § 119(a), this application claims the benefit of earlier filing date and right of priority to Korean Patent Application No. 10-2021-0099340, filed on Jul. 28, 2021, the contents of which are hereby incorporated by reference herein in its entirety, and, pursuant to 35 U.S.C. 119(e), claims the benefit of Provisional Application No. 63/229,541, filed on Aug. 5, 2021.

TECHNICAL FIELD

The following description relates to a wireless communication system, and more particularly to an operation method and device related to a procedure and timer for performing RRC connection through a relay UE by a remote UE in sidelink.

BACKGROUND ART

Wireless communication systems are being widely deployed to provide various types of communication services such as voice and data. In general, a wireless communication system is a multiple access system capable of supporting communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system, and a multi carrier frequency division multiple access (MC-FDMA) system.

A wireless communication system uses various radio access technologies (RATs) such as long term evolution (LTE), LTE-advanced (LTE-A), and wireless fidelity (WiFi). 5th generation (5G) is such a wireless communication system. Three key requirement areas of 5G include (1) enhanced mobile broadband (eMBB), (2) massive machine type communication (mMTC), and (3) ultra-reliable and low latency communications (URLLC). Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is augmented reality (AR) for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G Finally, logistics and freight tracking are important use cases for mobile communications that enable the tracking of inventory and packages wherever they are by using location-based information systems. The logistics and freight tracking use cases typically require lower data rates but need wide coverage and reliable location information.

A wireless communication system is a multiple access system that supports communication of multiple users by sharing available system resources (a bandwidth, transmission power, etc.). Examples of multiple access systems include a CDMA system, an FDMA system, a TDMA system, an OFDMA system, an SC-FDMA system, and an MC-FDMA system.

Sidelink (SL) refers to a communication scheme in which a direct link is established between user equipments (UEs) and the UEs directly exchange voice or data without intervention of a base station (BS). SL is considered as a solution of relieving the BS of the constraint of rapidly growing data traffic.

Vehicle-to-everything (V2X) is a communication technology in which a vehicle exchanges information with another vehicle, a pedestrian, and infrastructure by wired/wireless communication. V2X may be categorized into four types: vehicle-to-vehicle (V2V), vehicle-to-infrastructure (V2I), vehicle-to-network (V2N), and vehicle-to-pedestrian (V2P). V2X communication may be provided via a PC5 interface and/or a Uu interface.

As more and more communication devices demand larger communication capacities, there is a need for enhanced mobile broadband communication relative to existing RATs. Accordingly, a communication system is under discussion, for which services or UEs sensitive to reliability and latency are considered. The next-generation RAT in which eMBB, MTC, and URLLC are considered is referred to as new RAT or NR. In NR, V2X communication may also be supported.

FIG. 1 is a diagram illustrating V2X communication based on pre-NR RAT and V2X communication based on NR in comparison.

For V2X communication, a technique of providing safety service based on V2X messages such as basic safety message (BSM), cooperative awareness message (CAM), and decentralized environmental notification message (DENM) was mainly discussed in the pre-NR RAT. The V2X message may include location information, dynamic information, and attribute information. For example, a UE may transmit a CAM of a periodic message type and/or a DENM of an event-triggered type to another UE.

For example, the CAM may include basic vehicle information including dynamic state information such as a direction and a speed, vehicle static data such as dimensions, an external lighting state, path details, and so on. For example, the UE may broadcast the CAM which may have a latency less than 100 ms. For example, when an unexpected incident occurs, such as breakage or an accident of a vehicle, the UE may generate the DENM and transmit the DENM to another UE. For example, all vehicles within the transmission range of the UE may receive the CAM and/or the DENM. In this case, the DENM may have priority over the CAM.

In relation to V2X communication, various V2X scenarios are presented in NR. For example, the V2X scenarios include vehicle platooning, advanced driving, extended sensors, and remote driving.

For example, vehicles may be dynamically grouped and travel together based on vehicle platooning. For example, to perform platoon operations based on vehicle platooning, the vehicles of the group may receive periodic data from a leading vehicle. For example, the vehicles of the group may widen or narrow their gaps based on the periodic data.

For example, a vehicle may be semi-automated or full-automated based on advanced driving. For example, each vehicle may adjust a trajectory or maneuvering based on data obtained from a nearby vehicle and/or a nearby logical entity. For example, each vehicle may also share a dividing intention with nearby vehicles.

Based on extended sensors, for example, raw or processed data obtained through local sensor or live video data may be exchanged between vehicles, logical entities, terminals of pedestrians and/or V2X application servers. Accordingly, a vehicle may perceive an advanced environment relative to an environment perceivable by its sensor.

Based on remote driving, for example, a remote driver or a V2X application may operate or control a remote vehicle on behalf of a person incapable of driving or in a dangerous environment. For example, when a path may be predicted as in public transportation, cloud computing-based driving may be used in operating or controlling the remote vehicle. For example, access to a cloud-based back-end service platform may also be used for remote driving.

A scheme of specifying service requirements for various V2X scenarios including vehicle platooning, advanced driving, extended sensors, and remote driving is under discussion in NR-based V2X communication.

DISCLOSURE

Technical Problem

An object of embodiment(s) is to provide a procedure and a timer for performing RRC connection through a relay UE by a remote UE in sidelink.

Technical Solution

According to an embodiment, an operation method of a remote user equipment (UE) in a wireless communication system includes selecting a relay UE by the remote UE, establishing PC5 connection with the relay UE by the remote UE, and transmitting a message related to RRC connection to the relay UE by the remote UE, wherein the remote UE initiates one or more timers related to RRC connection with a base station (BS), and the one or more timers are different from a first timer used when the remote UE performs a direct RRC connection procedure with the BS.

According to an embodiment, a remote user equipment (UE) in a wireless communication system includes at least one processor, and at least one computer memory operatively connected to the at least one processor and configured to store instructions that when executed causes the at least one processor to perform operations, wherein the operations includes selecting a relay UE, establishing PC5 connection with the relay UE, and transmitting a message related to RRC connection to the relay UE, and the remote UE initiates one or more timers related to RRC connection with a base station (BS), and the one or more timers are different from a first timer used when the remote UE performs a direct RRC connection procedure with the BS.

An embodiment provides a processor for performing operations for a relay user equipment (UE) in a wireless communication system, the operations including selecting a relay UE, establishing PC5 connection with the relay UE, and transmitting a message related to RRC connection to the relay UE, wherein the remote UE initiates one or more timers related to RRC connection with a base station (BS), and the one or more timers are different from a first timer used when the remote UE performs a direct RRC connection procedure with the BS.

An embodiment provides a non-volatile computer-readable storage medium for storing at least one computer program including at least one instruction for causing at least one processor to perform operations for a relay user equipment (UE) when being executed by the at least one processor, the operations including selecting a relay UE, establishing PC5 connection with the relay UE, and transmitting a message related to RRC connection to the relay UE, wherein the remote UE initiates one or more timers related to RRC connection with a base station (BS), and the one or more timers are different from a first timer used when the remote UE performs a direct RRC connection procedure with the BS.

The one or more timers may include a second timer related to determining whether the remote UE establishes RRC connection with the BS.

The second timer may have a larger value than the first timer as a timer expiration value.

The second timer may start when a message related to the RRC connection is transmitted.

The remote UE may stop the second timer when receiving a RRCsetup message from the relay UE.

The remote UE may stop the second timer when performing relay reselection.

The remote UE may consider RRC connection failure based on not receiving a RRCsetup message until the timer expires from the UE.

The remote UE may reset a MAC related operation related to RRC connection when considering RRC connection failure.

The message related to RRC connection may be RRCsetupRequest.

The remote UE may communicate with at least one of another UE, a UE related to an autonomous vehicle, a BS, or a network.

Advantageous Effects

According to an embodiment, the configuration in which a remote UE uses a conventional timer may prevent a situation in which an appropriate time is not ensured due to a time required for RRC connection of the relay UE in RRC IDLE and the RRC connection is improperly considered to fail.

DESCRIPTION OF DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIGS. 12 to 15 are diagrams for explaining embodiment(s); and

FIGS. 16 to 22 are diagrams for explaining various devices to which embodiment(s) are applicable.

BEST MODE

In various embodiments of the present disclosure, "/" and "," should be interpreted as "and/or". For example, "A/B" may mean "A and/or B". Further, "A, B" may mean "A and/or B". Further, "A/B/C" may mean "at least one of A, B and/or C". Further, "A, B, C" may mean "at least one of A, B and/or C".

In various embodiments of the present disclosure, "or" should be interpreted as "and/or". For example, "A or B" may include "only A", "only B", and/or "both A and B". In other words, "or" should be interpreted as "additionally or alternatively".

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA), or the like. IEEE 802.16m is an evolution of IEEE 802.16e, offering backward compatibility with an IRRR 802.16e-based system. UTRA is a part of universal mobile telecommunications system (UMTS). 3rd generation partnership project (3GPP) long term evolution (LTE) is a part of evolved UMTS (E-UMTS) using evolved UTRA (E-UTRA). 3GPP LTE employs OFDMA for downlink (DL) and SC-FDMA for uplink (UL). LTE-advanced (LTE-A) is an evolution of 3GPP LTE.

A successor to LTE-A, 5th generation (5G) new radio access technology (NR) is a new clean-state mobile communication system characterized by high performance, low latency, and high availability. 5G NR may use all available spectral resources including a low frequency band below 1 GHz, an intermediate frequency band between 1 GHz and 10 GHz, and a high frequency (millimeter) band of 24 GHz or above.

While the following description is given mainly in the context of LTE-A or 5G NR for the clarity of description, the technical idea of an embodiment of the present disclosure is not limited thereto.

Figure 1:
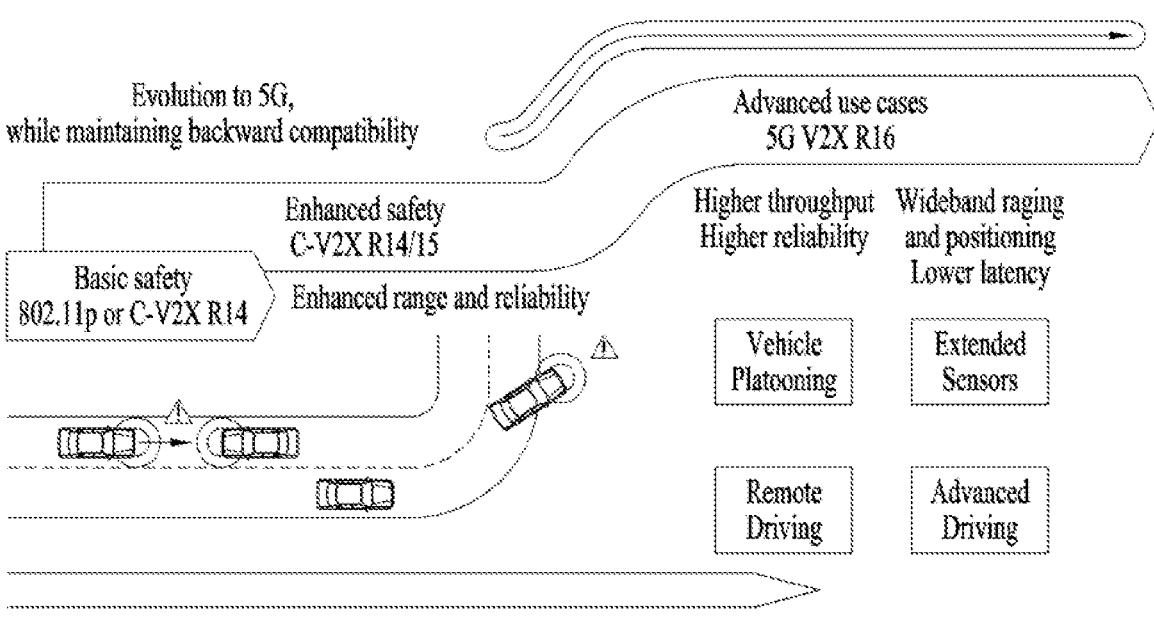
FIG. 1 is a diagram comparing vehicle-to-everything (V2X) communication based on pre-new radio access technology (pre-NR) with V2X communication based on NR.
Figure 2:
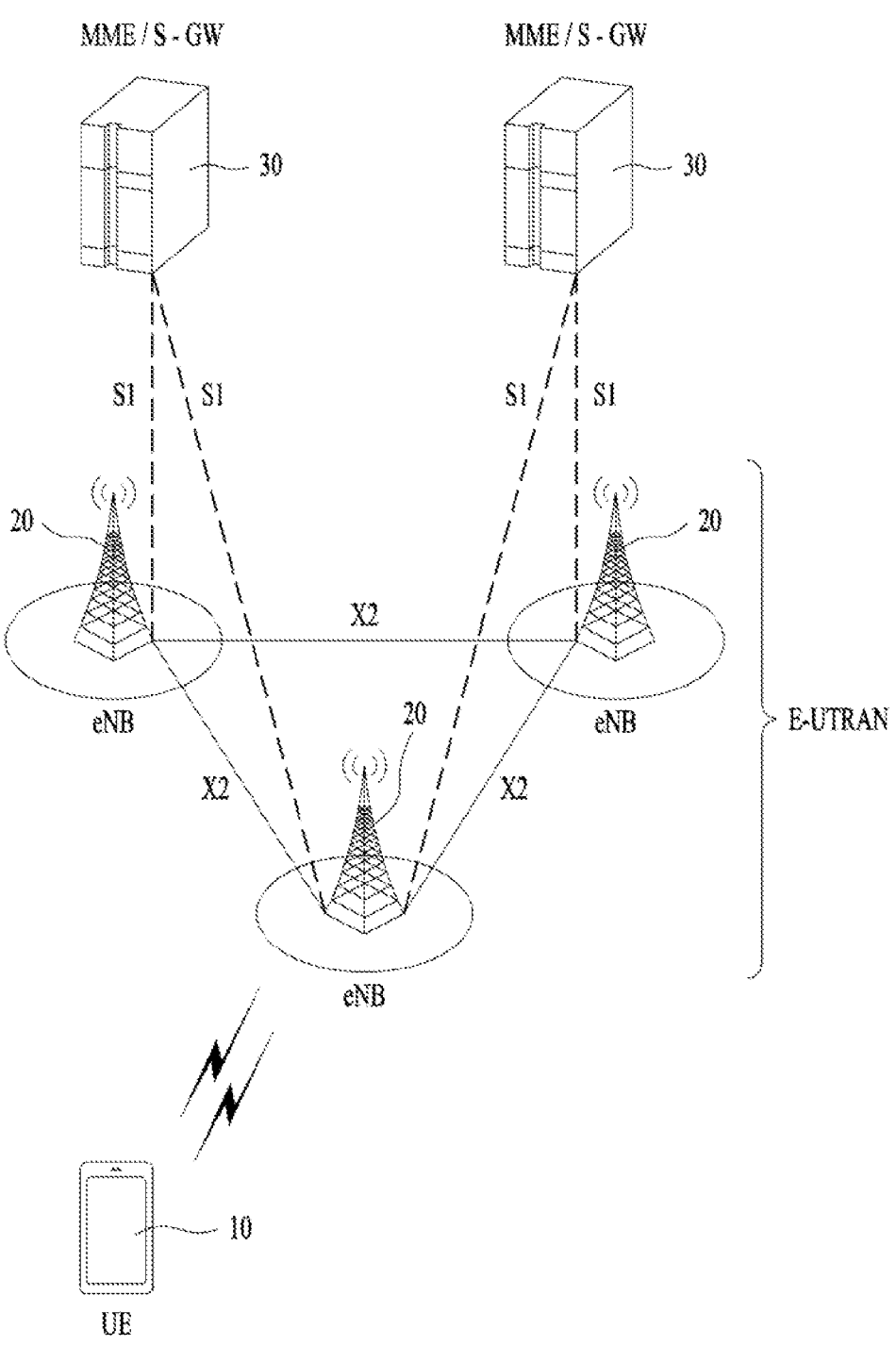
FIG. 2 is a diagram illustrating the structure of a long term evolution (LTE) system according to an embodiment of the present disclosure.

FIG. 2 illustrates the structure of an LTE system according to an embodiment of the present disclosure. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
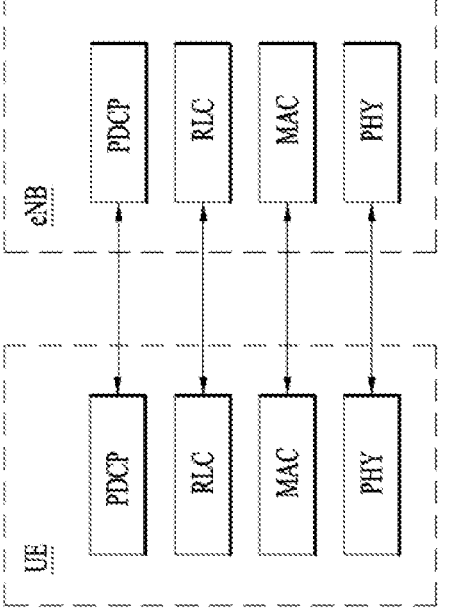
FIG. 3 is a diagram illustrating user-plane and control-plane radio protocol architectures according to an embodiment of the present disclosure.

FIG. 3(*a*) illustrates a user-plane radio protocol architecture according to an embodiment of the disclosure.

FIG. 3(*b*) illustrates a control-plane radio protocol architecture according to an embodiment of the disclosure. A user plane is a protocol stack for user data transmission, and a control plane is a protocol stack for control signal transmission.

Referring to FIGS. 3(*a*) and 3(*b*), the PHY layer provides an information transfer service to its higher layer on physical channels. The PHY layer is connected to the medium access control (MAC) layer through transport channels and data is transferred between the MAC layer and the PHY layer on the transport channels. The transport channels are divided according to features with which data is transmitted via a radio interface.

Data is transmitted on physical channels between different PHY layers, that is, the PHY layers of a transmitter and a receiver. The physical channels may be modulated in orthogonal frequency division multiplexing (OFDM) and use time and frequencies as radio resources.

The MAC layer provides services to a higher layer, radio link control (RLC) on logical channels. The MAC layer provides a function of mapping from a plurality of logical channels to a plurality of transport channels. Further, the MAC layer provides a logical channel multiplexing function by mapping a plurality of logical channels to a single transport channel. A MAC sublayer provides a data transmission service on the logical channels.

The RLC layer performs concatenation, segmentation, and reassembly for RLC serving data units (SDUs). In order to guarantee various quality of service (QoS) requirements of each radio bearer (RB), the RLC layer provides three operation modes, transparent mode (TM), unacknowledged mode (UM), and acknowledged Mode (AM). An AM RLC provides error correction through automatic repeat request (ARQ).

The RRC layer is defined only in the control plane and controls logical channels, transport channels, and physical channels in relation to configuration, reconfiguration, and release of RBs. An RB refers to a logical path provided by L1 (the PHY layer) and L2 (the MAC layer, the RLC layer, and the packet data convergence protocol (PDCP) layer), for data transmission between the UE and the network.

The user-plane functions of the PDCP layer include user data transmission, header compression, and ciphering. The control-plane functions of the PDCP layer include control-plane data transmission and ciphering/integrity protection.

RB establishment amounts to a process of defining radio protocol layers and channel features and configuring specific parameters and operation methods in order to provide a specific service. RBs may be classified into two types, signaling radio bearer (SRB) and data radio bearer (DRB). The SRB is used as a path in which an RRC message is transmitted on the control plane, whereas the DRB is used as a path in which user data is transmitted on the user plane.

Once an RRC connection is established between the RRC layer of the UE and the RRC layer of the E-UTRAN, the UE is placed in RRC_CONNECTED state, and otherwise, the UE is placed in RRC_IDLE state. In NR, RRC_INACTIVE state is additionally defined. A UE in the RRC_INACTIVE state may maintain a connection to a core network, while releasing a connection from an eNB.

DL transport channels carrying data from the network to the UE include a broadcast channel (BCH) on which system information is transmitted and a DL shared channel (DL SCH) on which user traffic or a control message is transmitted. Traffic or a control message of a DL multicast or broadcast service may be transmitted on the DL-SCH or a DL multicast channel (DL MCH). UL transport channels carrying data from the UE to the network include a random access channel (RACH) on which an initial control message is transmitted and an UL shared channel (UL SCH) on which user traffic or a control message is transmitted.

The logical channels which are above and mapped to the transport channels include a broadcast control channel (BCCH), a paging control channel (PCCH), a common control channel (CCCH), a multicast control channel (MCCH), and a multicast traffic channel (MTCH).

A physical channel includes a plurality of OFDM symbol in the time domain by a plurality of subcarriers in the frequency domain. One subframe includes a plurality of OFDM symbols in the time domain. An RB is a resource allocation unit defined by a plurality of OFDM symbols by a plurality of subcarriers. Further, each subframe may use specific subcarriers of specific OFDM symbols (e.g., the first OFDM symbol) in a corresponding subframe for a physical DL control channel (PDCCH), that is, an L1/L2 control channel. A transmission time interval (TTI) is a unit time for subframe transmission.

Figure 4:
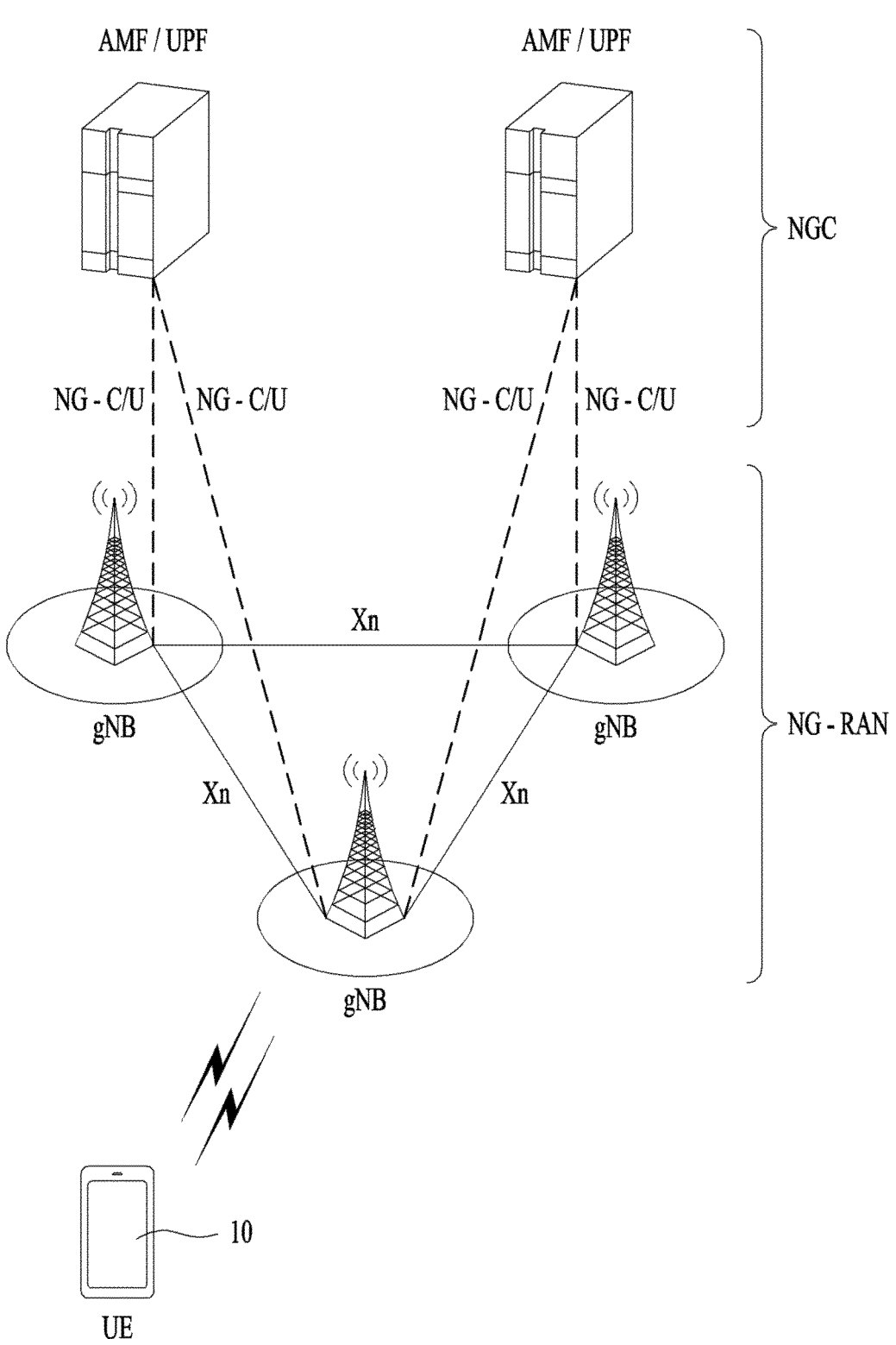
FIG. 4 is a diagram illustrating the structure of an NR system according to an embodiment of the present disclosure.

FIG. 4 illustrates the structure of an NR system according to an embodiment of the present disclosure.

Referring to FIG. 4, a next generation radio access network (NG-RAN) may include a next generation Node B (gNB) and/or an eNB, which provides user-plane and control-plane protocol termination to a UE. In FIG. 4, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 5:
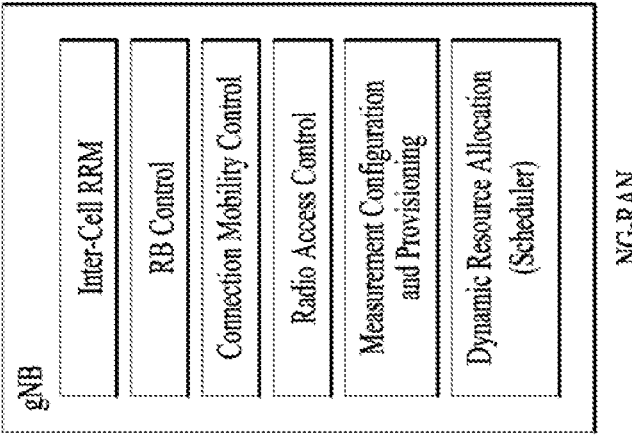
FIG. 5 is a diagram illustrating functional split between a next generation radio access network (NG-RAN) and a 5th generation core network (5GC) according to an embodiment of the present disclosure.

FIG. 5 illustrates functional split between the NG-RAN and the 5GC according to an embodiment of the present disclosure.

Referring to FIG. 5, a gNB may provide functions including inter-cell radio resource management (RRM), radio admission control, measurement configuration and provision, and dynamic resource allocation. The AMF may provide functions such as non-access stratum (NAS) security and idle-state mobility processing. The UPF may provide functions including mobility anchoring and protocol data unit (PDU) processing. A session management function (SMF) may provide functions including UE Internet protocol (IP) address allocation and PDU session control.

Figure 6:
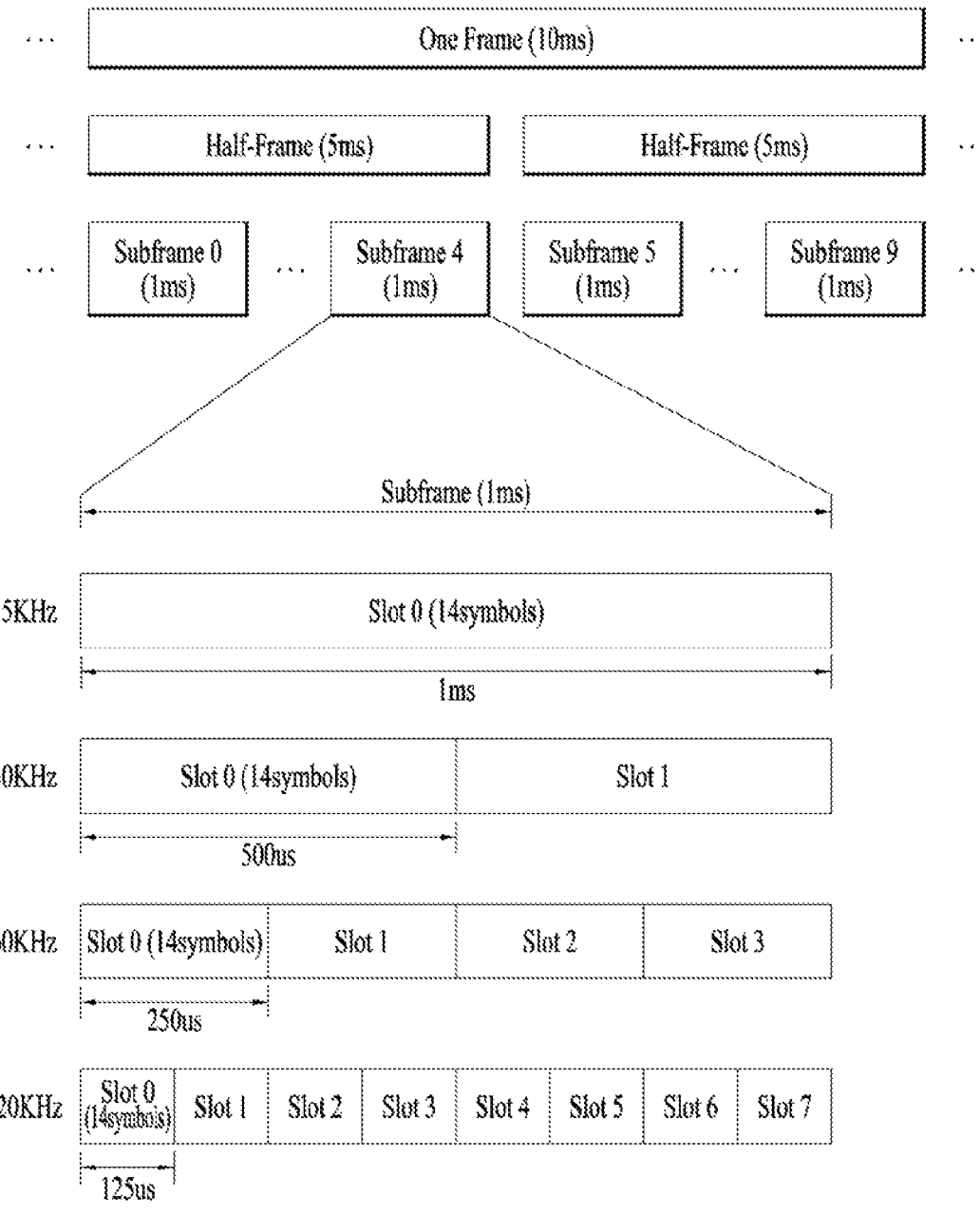
FIG. 6 is a diagram illustrating the structure of an NR radio frame to which embodiment(s) of the present disclosure is applicable.

FIG. 6 illustrates a radio frame structure in NR, to which embodiment(s) of the present disclosure is applicable.

Referring to FIG. 6, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot $N^{slot}_{symb}$, the number of slots per frame $N^{frame,u}_{slot}$, and the number of slots per subframe $N^{subframe,u}_{slot}$ according to an SCS configuration in the NCP case.

TABLE 1

| SCS (15*2u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15*2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource including the same number of symbols (e.g., a subframe, slot, or TTI) (collectively referred to as a time unit (TU) for convenience) may be configured to be different for the aggregated cells.

In NR, various numerologies or SCSs may be supported to support various 5G services. For example, with an SCS of 15 kHz, a wide area in traditional cellular bands may be supported, while with an SCS of 30 kHz/60 kHz, a dense urban area, a lower latency, and a wide carrier bandwidth may be supported. With an SCS of 60 kHz or higher, a bandwidth larger than 24.25 GHz may be supported to overcome phase noise.

An NR frequency band may be defined by two types of frequency ranges, FR1 and FR2. The numerals in each frequency range may be changed. For example, the two types of frequency ranges may be given in [Table 3]. In the NR system, FR1 may be a "sub 6 GHz range" and FR2 may be an "above 6 GHz range" called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerals in a frequency range may be changed in the NR system. For example, FR1 may range from 410 MHz to 7125 MHz as listed in [Table 4]. That is, FR1 may include a frequency band of 6 GHz (or 5850, 5900, and 5925 MHz) or above. For example, the frequency band of 6 GHz (or 5850, 5900, and 5925 MHz) or above may include an unlicensed band. The unlicensed band may be used for various purposes, for example, vehicle communication (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 7:
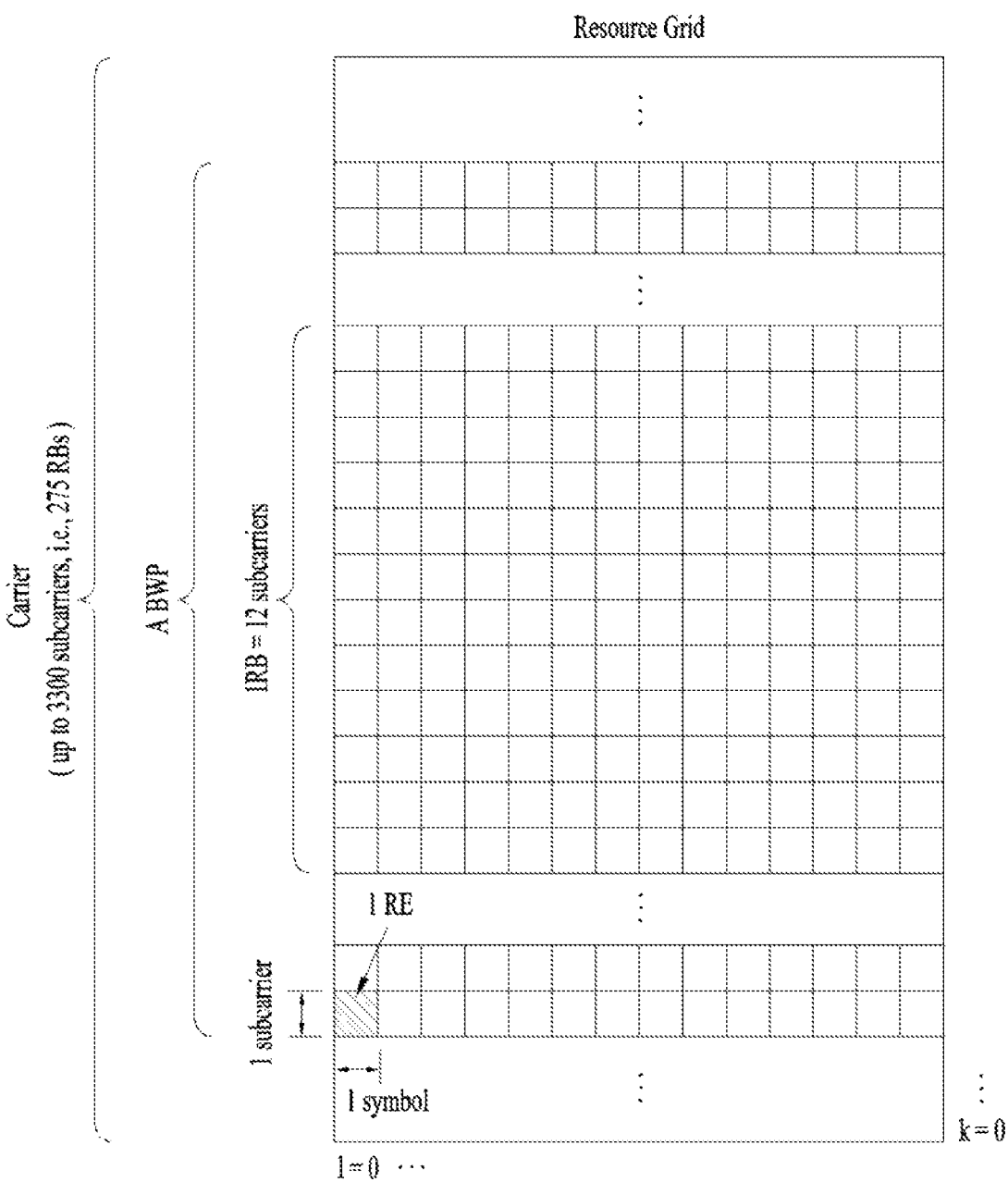
FIG. 7 is a diagram illustrating a slot structure of an NR frame according to an embodiment of the present disclosure.

FIG. 7 illustrates a slot structure in an NR frame according to an embodiment of the present disclosure.

Referring to FIG. 7, a slot includes a plurality of symbols in the time domain. For example, one slot may include 14 symbols in an NCP case and 12 symbols in an ECP case. Alternatively, one slot may include 7 symbols in an NCP case and 6 symbols in an ECP case.

A carrier includes a plurality of subcarriers in the frequency domain. An RB may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, or the like). A carrier may include up to N (e.g., 5) BWPs. Data communication may be conducted in an activated BWP. Each element may be referred to as a resource element (RE) in a resource grid, to which one complex symbol may be mapped.

A radio interface between UEs or a radio interface between a UE and a network may include L1, L2, and L3. In various embodiments of the present disclosure, L1 may refer to the PHY layer. For example, L2 may refer to at least one of the MAC layer, the RLC layer, the PDCH layer, or the SDAP layer. For example, L3 may refer to the RRC layer.

Now, a description will be given of sidelink (SL) communication.

Figure 8:
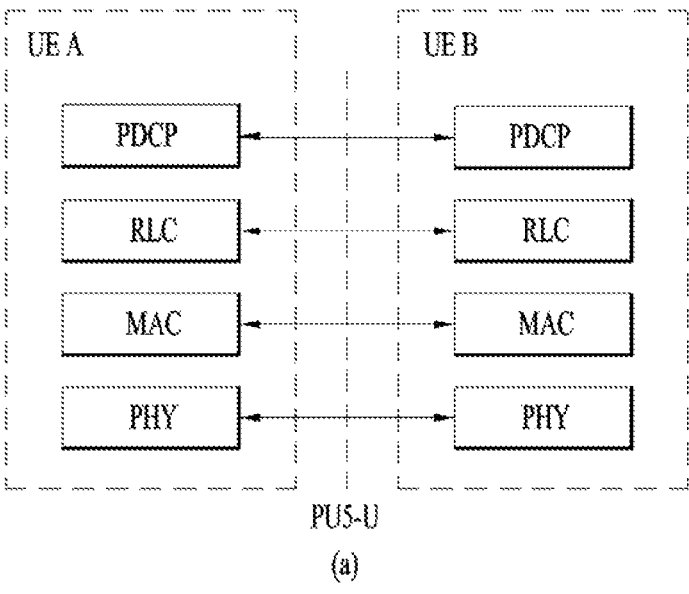
FIG. 8 is a diagram illustrating radio protocol architectures for sidelink (SL) communication according to an embodiment of the present disclosure.
Figure 8:
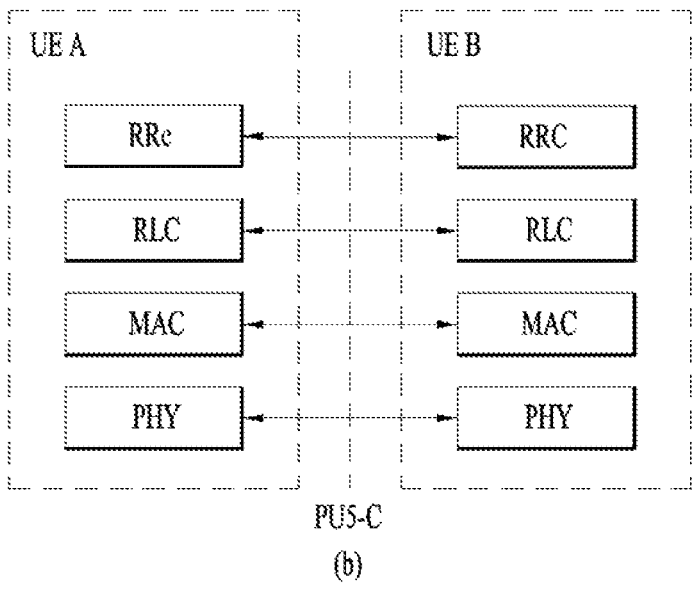

FIG. 8 illustrates a radio protocol architecture for SL communication according to an embodiment of the present disclosure. Specifically, FIG. 8(a) illustrates a user-plane protocol stack in LTE, and FIG. 8(b) illustrates a control-plane protocol stack in LTE.

Figure 9:
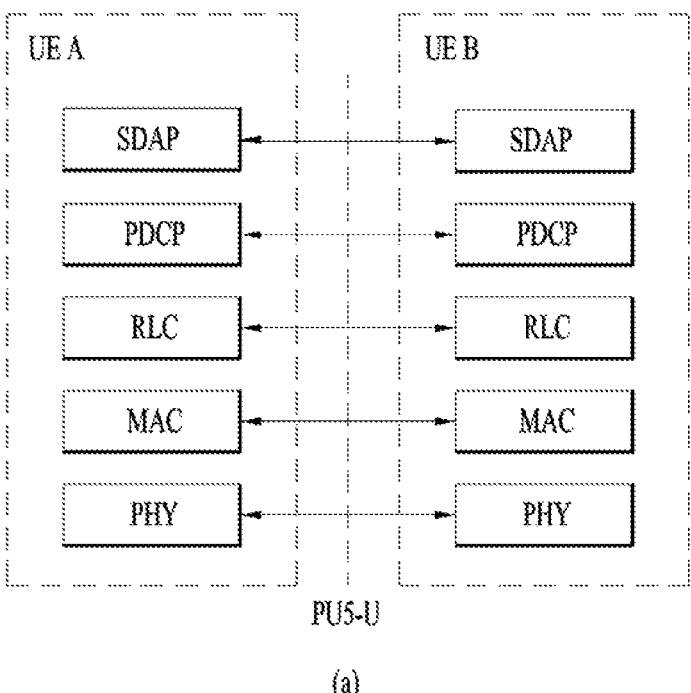
FIG. 9 is a diagram illustrating radio protocol architectures for SL communication according to an embodiment of the present disclosure.
Figure 9:
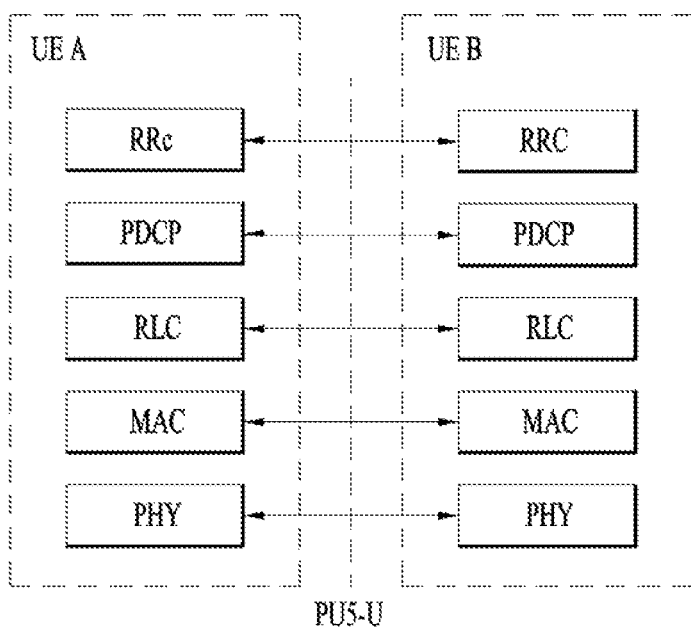

FIG. 9 illustrates a radio protocol architecture for SL communication according to an embodiment of the present disclosure. Specifically, FIG. 9(a) illustrates a user-plane protocol stack in NR, and FIG. 9(b) illustrates a control-plane protocol stack in NR.

Figure 10:
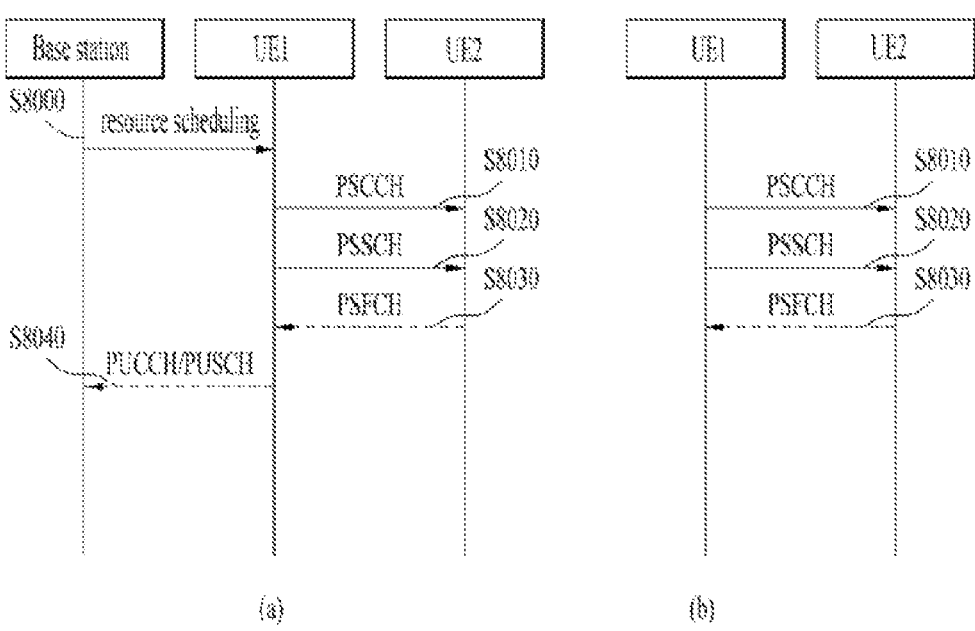
FIG. 10 is a diagram illustrating a procedure for performing V2X or SL communication by a UE according to a transmission mode.

FIG. 10 illustrates a procedure of performing V2X or SL communication by a UE depending on a transmission mode according to an embodiment of the present disclosure. The embodiment of FIG. 10 may be combined with various embodiments of the present disclosure. In various embodiments of the present disclosure, a transmission mode may be referred to as a mode or a resource allocation mode. For the convenience of the following description, a transmission mode in LTE may be referred to as an LTE transmission mode, and a transmission mode in NR may be referred to as an NR resource allocation mode.

For example, FIG. 10 (a) illustrates a UE operation related to LTE transmission mode 1 or LTE transmission mode 3. Alternatively, for example, FIG. 10 (a) illustrates a UE operation related to NR resource allocation mode 1. For example, LTE transmission mode 1 may apply to general SL communication, and LTE transmission mode 3 may apply to V2X communication.

For example, FIG. 10 (b) illustrates a UE operation related to LTE transmission mode 2 or LTE transmission mode 4. Alternatively, for example, FIG. 10 (b) illustrates a UE operation related to NR resource allocation mode 2.

Referring to FIG. 10 (a), in LTE transmission mode 1, LTE transmission mode 3, or NR resource allocation mode 1, a BS may schedule an SL resource to be used for SL transmission by a UE. For example, in a step S8000, the BS may transmit information related to an SL resource and/or information related to a UE resoruce to a first UE. For exmaple, the UL resource may include a PUCCH resource and/pr a PUSCH resource. For exmaple, the UL resource may be a resource to report SL HARQ feedback to the BS.

For example, a first UE may receive information related to a Dynamic Grant (DG) resource and/or information related to a Configured Grant (CG) resource from a BS. For example, the CG resource may include a CG type 1 resource or a CG type 2 resource. In the present specification, the DG resource may be a resource that the BS configures/allocates to the first UE over Downlink Control Information (DCI). In the present specification, the CG resource may be a (periodic) resource configured/allocated by the BS to the first UE over a DCI and/or an RRC message. For example, in the case of the CG type 1 resource, the BS may transmit an RRC message including information related to the CG resource to the first UE. For example, in the case of the CG type 2 resource, the BS may transmit an RRC message including information related to the CG resource to the first UE, and the BS may transmit DCI related to activation or release of the CG resource to the first UE.

In a step S8010, the first UE may transmit PSCCH (e.g., Sidelink Control Information (SCI) or 1st-stage SCI) to a second UE based on the resource scheduling. In a step S8020, the first UE may transmit PSSCH (e.g., 2nd-stage SCI, MAC PDU, data, etc.) related to the PSCCH to the second UE. In a step S8030, the first IE may receive PSFCH related to the PSCCH/PSSCH from the second UE. For example, HARQ feedback information (e.g., NACK information or ACK information) may be received from the second UE over the PSFCH. In a step S8040, the first UE may transmit/report HARQ feedback information to the BS over PUCCH or PUSCH. For example, the HARQ feedback information reported to the BS may include information generated by the first UE based on HARQ feedback information received from the second UE. For example, the HARQ feedback information reported to the BS may include information generated by the first UE based on a preset rule. For example, the DCI may be a DCI for scheduling of SL. For example, the format of the DCI may include DCI format 3_0 or DCI format 3_1. Table 5 shows one example of DCI for scheduling of SL.

<center>TABLE 5</center>

| 7.3.1.4.1 Format 3_0 |
|---|

DCI format 3_0 is used for scheduling of NR PSCCH and NR PSSCH in one cell.
The following information is transmitted by means of the DCI format 3_0 with CRC scrambled by SL-RNTI or SL-CS-RNTI:
-     Resource pool index –$\lceil \log_2 I \rceil$ bits, where I is the number of resource pools for transmission configured by the higher layer parameter sl-TxPoolScheduling.
-     Time gap – 3 bits determined by higher layer parameter sl-DCI-ToSL-Trans, as defined in clause 8.1.2.1 of [6, TS 38.214]
-     HARQ process number – 4 bits as defined in clause 16.4 of [5, TS 38.213]
-     New data indicator – 1 bit as defined in clause 16.4 of [5, TS 38.213]
-     Lowest index of the subchannel allocation to the initial transmission –
$\lceil \log_2(N_{subchannel}^{SL}) \rceil$ bits as defined in clause 8.1.2.2 of [6, TS 38.214]
-     SCI format 1-A fields according to clause 8.3.1.1:
-     Frequency resource assignment.
-     Time resource assignment.
-     PSFCH-to-HARQ feedback timing indicator – $\lceil \log_2 N_{fb\_timing} \rceil$ bits, where
$N_{fb\_timing}$ is the number of entries in the higher layer parameter sl-PSFCH-ToPUCCH, as defined in clause 16.5 of [5, TS 38.213]
-     PUCCH resource indicator – 3 bits as defined in clause 16.5 of [5, TS 38.213].
-     Configuration index – 0 bit if the UE is not configured to monitor DCI format 3_0 with CRC scrambled by SL-CS-RNTI; otherwise 3 bits as defined in clause 8.1.2 of [6, TS 38.214]. If the UE is configured to monitor DCI format 3_0 with CRC scrambled by SL-CS-RNTI, this field is reserved for DCI format 3_0 with CRC scrambled by SL-RNTI.
-     Counter sidelink assignment index – 2 bits
-     2 bits as defined in clause 16.5.2 of [5, TS 38.213] if the UE is configured with pdsch-HARQ-ACK-Codebook = dynamic
-     2 bits as defined in clause 16.5.1 of [5, TS 38.213] if the UE is configured with pdsch-HARQ-ACK-Codebook = semi-static
-     Padding bits, if required
If multiple transmit resource pools are provided in sl-TxPoolScheduling, zeros shall be appended to the DCI format 3_0 until the payload size is equal to the size of a DCI format 3_0 given by a configuration of the transmit resource pool resulting in the largest number of information bits for DCI format 3_0.
If the UE is configured to monitor DCI format 3_1 and the number of information bits in DCI format 3_0 is less than the payload of DCI format 3_1, zeros shall be appended to DCI format 3_0 until the payload size equals that of DCI format 3_1.

| 7.3.1.4.2 Format 3_1 |
|---|

DCI format 3_1 is used for scheduling of LTE PSCCH and LTE PSSCH in one cell.
The following information is transmitted by means of the DCI format 3_1 with CRC scrambled by SL-L-CS-RNTI:
-     Timing offset – 3 bits determined by higher layer parameter sl-TimeOffsetEUTRA, as defined in clause 16.6 of [5, TS 38.213]
-     Carrier indicator – 3 bits as defined in 5.3.3.1.9A of [11, TS 36.212].
-     Lowest index of the subchannel allocation to the initial transmission –
$\lceil \log_2(N_{subchannel}^{SL}) \rceil$ bits as defined in 5.3.3.1.9A of [11, TS 36.212].
-     Frequency resource location of initial transmission and retransmission, as defined in 5.3.3.1.9A of [11, TS 36.212]
-     Time gap between initial transmission and retransmission, as defined in 5.3.3.1.9A of [11, TS 36.212]
-     SL index – 2 bits as defined in 5.3.3.1.9A of [11, TS 36.212]
-     SL SPS configuration index – 3 bits as defined in clause 5.3.3.1.9A of [11, TS 36.212].
-     Activation/release indication – 1 bit as defined in clause 5.3.3.1.9A of [11, TS 36.212].

Referring to FIG. 10 (b), in an LTE transmission mode 2, an LTE transmission mode 4, or an NR resource allocation mode 2, a UE may determine an SL transmission resource within an SL resource configured by a BS/network or a preconfigured SL resource. For example, the configured SL resource or the preconfigured SL resource may be a resource pool. For example, the UE may autonomously select or schedule resources for SL transmission. For example, the UE may perform SL communication by selecting a resource by itself within a configured resource pool. For example, the UE may perform sensing and resource (re)selection procedures to select a resource by itself within a selection window. For example, the sensing may be performed in unit of a sub-channel. For example, in the step S8010, the first UE having self-selected a resource in the resource pool may transmit PSCCH (e.g., Side Link Control Information (SCI) or 1$^{st}$-stage SCI) to the second UE using the resource. In the step S8020, the first UE may transmit PSSCH (e.g., 2$^{nd}$-stage SCI, MAC PDU, data, etc.) related to the PSCCH to the second UE. In the step S8030, the first UE may receive PSFCH related to the PSCCH/PSSCH from the second UE.

Referring to FIG. 10 (a) or FIG. 10 (b), for example, the first UE may transmit the SCI to the second UE on the PSCCH. Alternatively, for example, the first UE may transmit two consecutive SCIs (e.g., two-stage SCI) to the second UE on the PSCCH and/or PSSCH. In this case, the second UE may decode the two consecutive SCIs (e.g., two-stage SCI) to receive the PSSCH from the first UE. In the present specification, the SCI transmitted on the PSCCH may be referred to as a 1$^{st}$ SCI, a 1$^{st}$-stage SCI, or a 1$^{st}$-stage SCI format, and the SCI transmitted on the PSSCH may be referred to as a 2nd SCI, a 2nd SCI, a 2nd-stage SCI format. For example, the 1st-stage SCI format may include SCI format 1-A, and the 2$^{nd}$-stage SCI format may include SCI format 2-A and/or SCI format 2-B. Table 6 shows one example of a 1st-stage SCI format.

TABLE 6

8.3.1.1 SCI format 1-A

SCI format 1-A is used for the scheduling of PSSCH and $2^{nd}$-stage-SCI on PSSCH
The following information is transmitted by means of the SCI format 1-A:

Priority - 3 bits as specified in clause 5.4.3.3 of [12, TS 23.287] and clause 5.22.1.3.1 of [8, TS 38.321].

Frequency resource assignment - $\left\lceil \log_2\left(\dfrac{N_{subChannel}^{SL}\left(N_{subChannel}^{SL} + 1\right)}{2}\right)\right\rceil$ bits when the value of the higher layer parameter sl-MaxNumPerReserve is configured to 2; otherwise $\left\lceil \log_2\left(\dfrac{N_{subChannel}^{SL}\left(N_{subChannel}^{SL} + 1\right)\left(2N_{subChannel}^{SL} + 1\right)}{6}\right)\right\rceil$ bits when the value of the higher layer parameter sl-MaxNumPerReserve is configured to 3, as defined in clause 8.1.2.2 of [6, TS 38.214].

Time resource assignment - 5 bits when the value of the higher layer parameter sl-MaxNumPerReserve is configured to 2; otherwise 9 bits when the value of the higher layer parameter sl-MaxNumPerReserve is configured to 3, as defined in clause 8.1.2.1 of [6, TS 38.214].

Resource reservation period - $\lceil \log_2 N_{rsv\_period}\rceil$ bits as defined in clause 8.1.4 of [6, TS 38.214], where $N_{rsv\_period}$ is the number of entries in the higher layer parameter sl-ResourceReservePeriodList, if higher layer parameter sl-MultiReserveResource is configured; 0 bit otherwise.

DMRS pattern - $\lceil \log_2 N_{pattern}\rceil$ bits as defined in clause 8.4.1.1.2 of [4, TS 38.211], where $N_{pattern}$ is the number of DMRS patterns configured by higher layer parameter sl-PSSCH-DMRS-TimePatternList.

$2^{nd}$-stage SCI format - 2 bits as defined in Table 8.3.1.1-1.

Beta_offset indicator - 2 bits as provided by higher layer parameter sl-BetaOffsets2ndSCI and Table 8.3.1.1-2.

Number of DMRS port - 1 bit as defined in Table 8.3.1.1-3.

Modulation and coding scheme - 5 bits as defined in clause 8.1.3 of [6, TS 38.214].

Additional MCS table indicator - as defined in clause 8.1.3.1 of [6, TS 38.214]: 1 bit if one MCS table is configured by higher layer parameter sl-Additional-MCS-Table; 2 bits if two MCS tables are configured by higher layer parameter sl- Additional-MCS-Table; 0 bit otherwise.

PSFCH overhead indication - 1 bit as defined clause 8.1.3.2 of [6, TS 38.214] if higher layer parameter sl-PSFCH-Period = 2 or 4; 0 bit otherwise.

Reserved - a number of bits as determined by higher layer parameter sl-NumReservedBits, with value set to zero.

Table 7 shows one example of a $2^{nd}$-stage SCI format.

TABLE 7

8.4    Sidelink control information on PSSCH
SCI carried on PSSCH is a $2^{nd}$-stage SCI, which transports sidelink scheduling information, and/or inter-UE coordination related information.

8.4.1    $2^{nd}$-stage SCI formats
The fields defined in each of the $2^{nd}$-stage SCI formats below are mapped to the information bits $\alpha_0$ to $\alpha_{A-1}$ as follows:

Each field is mapped in the order in which it appears in the description, with the first field mapped to the lowest order information bit $\alpha_0$ and each successive field mapped to higher order information bits. The most significant bit of each field is mapped to the lowest order information bit for that field, e.g. the most significant bit of the first field is mapped to $\alpha_0$.

8.4.1.1 SCI format 2-A
SCI format 2-A is used for the decoding of PSSCH, with HARQ operation when HARQ-ACK information includes ACK or NACK, when HARQ-ACK information includes only NACK, or when there is no feedback of HARQ-ACK information.

The following information is transmitted by means of the SCI format 2-A:

- HARQ process number − 4 bits as defined in clause 16.4 of [5, TS 38.213].
- New data indicator − 1 bit as defined in clause 16.4 of [5, TS 38.213].
- Redundancy version − 2 bits as defined in clause 16.4 of [6, TS 38.214].
- Source ID − 8 bits as defined in clause 8.1 of [6, TS 38.214].
- Destination ID − 16 bits as defined in clause 8.1 of [6, TS 38.214].
- HARQ feedback enabled/disabled indicator − 1 bit as defined in clause 16.3 of [5, TS 38.213].
- Cast type indicator − 2 bits as defined in Table 8.4.1.1-1 and clause 8.1 of [6, TS 38.214].
- CSI request − 1 bit as defined in clause 8.2.1 of [6, TS 38.214] and clause 8.1 of [6, TS 38.214].

Referring to FIG. 10 (*a*) or FIG. 10 (*b*), in the step S8030, the first UE may receive the PSFCH based on Table 8. For example, the first UE and the second UE may determine a PSFCH resource based on Table 8, and the second UE may transmit HARQ feedback to the first UE using the PSFCH resource.

TABLE 8

| 16.3 UE procedure for reporting HARQ-ACK on sidelink |
|---|

A UE can be indicated by an SCI format scheduling a PSSCH reception to transmit a PSFCH with HARQ-ACK information in response to the PSSCH reception. The UE provides HARQ-ACK information that includes ACK or NACK, or only NACK.

A UE can be provided, by sl-PSFCH-Period, a number of slots in a resource pool for a period of PSFCH transmission occasion resources. If the number is zero, PSFCH transmissions from the UE in the resource pool are disabled.

A UE expects that a slot $t'^{SL}_k$ $(0 \le k < T'_{max})$ has a PSFCH transmission occasion resource if $k \bmod N^{PSFCH}_{PSSCH} = 0$, where $t'^{SL}_k$ is defined in [6, TS 38.214], and $T'_{max}$ is a number of slots that belong to the resource pool within 10240 msec according to [6, TS 38.214], and $N^{PSFCH}_{PSSCH}$ is provided by sl-PSFCH-Period.

A UE may be indicated by higher layers to not transmit a PSFCH in response to a PSSCH reception [11, TS 38.321].

If a UE receives a PSSCH in a resource pool and the HARQ feedback enabled/disabled indicator field in an associated SCI format 2-A or a SCI format 2-B has value 1 [5, TS 38.212], the UE provides the HARQ-ACK information in a PSFCH transmission in the resource pool. The UE transmits the PSFCH in a first slot that includes PSFCH resources and is at least a number of slots, provided by sl-MinTimeGapPSFCH, of the resource pool after a last slot of the PSSCH reception.

A UE is provided by sl-PSFCH-RB-Set a set of $M^{PSFCH}_{PRB,set}$ PRBs in a resource pool for PSFCH transmission in a PRB of the resource pool. For a number of $N_{subch}$ sub-channels for the resource pool, provided by sl-NumSubchannel, and a number of PSSCH slots associated with a PSFCH slot that is less than or equal to $N^{PSFCH}_{PSSCH}$, the UE allocates the $[(i + j \cdot N^{PSFCH}_{PSSCH}) \cdot M^{PSFCH}_{subch,slot}, (i + 1 + j \cdot N^{PSFCH}_{PSSCH}) \cdot M^{PSFCH}_{subch,slot} - 1]$ PRBs from the $M^{PSFCH}_{PRB,set}$ PRBs to slot i among the PSSCH slots associated with the PSFCH slot and sub-channel j, where $M^{PSFCH}_{subch,slot} = M^{PSFCH}_{PRB,set}/(N_{subch} \cdot N^{PSFCH}_{PSSCH}, 0 \le i < N^{PSFCH}_{PSSCH}, 0 \le j < N_{subch}$, and the allocations starts in an ascending order of i and continues in an ascending order of j. The UE expects that $M^{PSFCH}_{PRB,set}$ is a multiple of $N_{subch} \cdot N^{PSFCH}_{PSSCH}$.

The second OFDM symbol l' of PSFCH transmission in a slot is defined as l' = sl-StartSymbol + sl-LengthSymbols − 2 .

A UE determines a number of PSFCH resources available for multiplexing HARQ-ACK information in a PSFCH transmission as $R^{PSFCH}_{PRB,CS} = N^{PSFCH}_{type} \cdot M^{PSFCH}_{subch,slot} \cdot N^{PSFCH}_{CS}$ where $N^{PSFCH}_{CS}$ is a number of cyclic shift pairs for the resource pool provided by sl-NumMuxCS-Pair and, based on an indication by sl-PSFCH-CandidateResourceType,

- if sl-PSFCH-CandidateResourceType is configured as startSubCH, $N^{PSFCH}_{type} = 1$ and the $M^{PSFCH}_{subch,slot}$ PRBs are associated with the starting sub-channel of the corresponding PSSCH;
- if sl-PSFCH-CandidateResourceType is configured as allocSubCH, $N^{PSFCH}_{type} = N^{PSSCH}_{subch}$ and the $N^{PSSCH}_{subch} \cdot M^{PSFCH}_{subch,slot}$ PRBs are associated with the $N^{PSSCH}_{subch}$ sub-channels of the corresponding PSSCH.

The PSFCH resources are first indexed according to an ascending order of the PRB index, from the $N^{PSFCH}_{type} \cdot M^{PSFCH}_{subch,slot}$ PRBs, and then according to an ascending order of the cyclic shift pair index from the $N^{PSFCH}_{CS}$ cyclic shift pairs.

A UE determines an index of a PSFCH resource for a PSFCH transmission in response to a PSSCH reception as $(P_{ID} + M_{ID}) \bmod R^{PSFCH}_{PRB,CS}$ where $P_{ID}$ is a physical layer source ID provided by SCI format 2-A or 2-B [5, TS 38.212] scheduling the PSSCH reception, and $M_{ID}$ is the identity of the UE receiving the PSSCH as indicated by higher layers if the UE detects a SCI format 2-A with Cast type indicator field value of "01"; otherwise, $M_{ID}$ is zero.

A UE determines a $m_0$ value, for computing a value of cyclic shift a [4, TS 38.211], from a cyclic shift pair index corresponding to a PSFCH resource index and from $N^{PSFCH}_{CS}$ using Table 16.3-1.

45

Referring to FIG. 10 (*a*), in a step S8040, the first UE may transmit SL HARQ feedback to the BS over PUCCH and/or PUSCH based on Table 9.

TABLE 9

| 16.5 UE procedure for reporting HARQ-ACK on uplink |
|---|

A UE can be provided PUCCH resources or PUSCH resources [12, TS 38.331] to report HARQ-ACK information that the UE generates based on HARQ-ACK information that the UE obtains from PSFCH receptions, or from absence of PSFCH receptions. The UE reports HARQ-ACK information on the primary cell of the PUCCH group, as described in clause 9, of the cell where the UE monitors PDCCH for detection of DCI format 3_0.

For SL configured grant Type 1 or Type 2 PSSCH transmission by a UE within a time period provided by sl-PeriodCG the UE generates one HARQ-ACK information bit in response to the PSFCH receptions to multiplex in a PUCCH transmission occasion that is after a last time resource, in a set of time resources.

For PSSCH transmission scheduled by a DCI format 3_0, a UE generates HARQ-ACK information in response to PSFCH receptions to multiplex in a PUCCH transmission occasion that is after a last time resource in a set of time resources provided by the DCI format 3_0.

From a number of PSFCH reception occasions, the UE generates HARQ-ACK information to report in a PUCCH or PUSCH transmission. The UE can be indicated by a SCI format to perform one of the following and the UE constructs a HARQ-ACK codeword with HARQ-ACK information when applicable

- for one or more PSFCH reception occasions associated with SCI format 2-A with Cast type indicator field value of "10"
  - generate HARQ-ACK information with same value as a value of HARQ-ACK information the UE determines from the last PSFCH reception from the number of PSFCH reception occasions corresponding to PSSCH transmissions or, if the UE determines that a PSFCH is not received at the last PSFCH reception TABLE 9-continued occasion and ACK is not received in any of previous PSFCH reception occasions, generate NACK
- for one or more PSFCH reception occasions associated with SCI format 2-A with Cast type indicator field value
  of "01"
  - generate ACK if the UE determines ACK from at least one PSFCH reception occasion, from the number of
    PSFCH reception occasions corresponding to PSSCH transmissions in PSFCH resources corresponding to
    every identity $M_{ID}$ of the UEs that the UE expects to receive the PSSCH, as described in clause 16.3,
    otherwise generate NACK
- for one or more PSFCH receptions occasions associated with SCI format 2-B or SCI format 2-A with Cast type
  indicator field value of "11"
  - generate ACK when the UE determines absence of PSFCH receptions for the last PSFCH reception occasion
    from the number of PSFCH reception occasions corresponding to PSSCH transmissions; otherwise, generate
    NACK
After a UE transmits PSSCHs and receives PSFCHs in corresponding PSFCH resource occasions, the priority value of
HARQ-ACK information is same as the priority value of the PSSCH transmissions that is associated with the PSFCH
reception occasions providing the HARQ-ACK information.
The UE generates a NACK when due to prioritization as described in clause 16.2.4, the UE does not receive PSFCH in
any PSFCH reception occasion associated with a PSSCH transmission in a resource provided by a DCI format 3_0 or
for a configured grant, in a resource provided in a single period and for which the UE is provided a PUCCH resource to
report HARQ-ACK information. The priority value of the NACK is same as the priority value of the PSSCH
transmission.
The UE generates a NACK when due to prioritization as described in clause 16.2.4, the UE does not transmit a PSSCH
in any of the resources provided by a DCI format 3_0 or, for a configured grant, in any of the resources provided in a
single period and for which the UE is provided a PUCCH resource to report HARQ-ACK information. The priority
value of the NACK is same as the priority value of the PSSCH that was not transmitted due to prioritization.
The UE generates an ACK if the UE does not transmit a PSCCH with a SCI format 1-A scheduling a PSSCH in any of
the resources provided by a configured grant in a single period and for which the UE in provided a PUCCH resource to
report HARQ-ACK information. The priority value of the ACK is same as the largest priority value among the possible
priority values for the configured grant.

Sidelink (SL) Discontinuous Reception (DRX)

A MAC entity may be configured by an RRC as a DRX function of controlling a PDCCH monitoring activity of a UE for C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, AI-RNTI, SL-RNTI, SLCS-RNTI, and SL Semi-Persistent Scheduling V-RNTI of the MAC entity. When using a DRX operation, a MAC entity should monitor PDCCH according to prescribed requirements. When DRX is configured in RRC_CONNECTED, a MAC entity may discontinuously monitor PDCCH for all activated serving cells.

RRC may control a DRX operation by configuring the following parameters.

drx-onDurationTimer: Duration time upon DRX cycle start drx-SlotOffset: Delay before drx-onDurationTimer start drx-InactivityTimer: Duration time after PDCCH that indicates new UL or DL transmission for a MAC entity drx-RetransmissionTimerDL (per DL HARQ process except for the broadcast process): Maximum duration time until DL retransmission is received drx-RetransmissionTimerUL (per UL HARQ process): Maximum time until a grat for retransmission is received drx-LongCycleStartOffset: Long DRX cycle and drx-StartOffset that define a subframe in which Long and Short DRX cycles start drx-ShortCycle(optional): Short DRX cycle drx-ShortCycleTimer(optional): Period for a UE to follow a short CRX cycle drx-HARQ-RTT-TimerDL (per DL HARQ process except for the broadcast process): Minimum duration time before DL allocation for HARQ retransmission is predicted by a MAC entity drx-HARQ-RTT-TimerUL (per UL HARQ process): Minimum duration time before a UL HARQ retransmission grant is predicted by a MAC entity drx-RetransmissionTimerSL (per HARQ process): Maximum period until a grant for SL retransmission is received drx-HARQ-RTT-TimerSL (per HARQ process): Minimum duration time before an SL retransmission grant is predicted by a MAC entity ps-Wakeup(optional): Configuration for starting drx-on DurationTimer connected when DCP is monitored but not detected ps-TransmitOtherPeriodicCSI(optional): Configuration to report a periodic CSI that is not L1-RSRP on PUCCH for a time duration period indicated by drx-onDurationTimer when connected drx-onDurationTimer does not start despite that DCP is configured ps-TransmitPeriodicLI-RSRP(optional): Configuration to transmit a periodic CSI that is L1-RSRP on PUCCH for a time indicated by a drx-onDurationTimer when a connected drx-onDurationTimer does not start despite that DCP is configured A serving cell of a MAC entity may be configured by RRC in two DRX groups having separate DRX parameters. When the RRC does not configure a secondary DRX group, a single DRX group exists only and all serving cells belong to the single DRX group. When two DRX groups are configured, each serving cell is uniquely allocated to each of the two groups. DRX paramters separately configured for each DRX group include drx-onDurationTimer and drx-InactivityTimer. A DRX parameter common to a DRX group is as follows.

drx-onDurationTimer, drx-InactivityTimer.

DRX parameters common to a DRX group are as follows.

drx-SlotOffset, drx-RetransmissionTimerDL, drx-Retrans drx-SlotOffset, drx-RetransmissionTimerDL, drx-RetransmissionTimerUL, drx-LongCycleStartOffset, drx-ShortCycle (optional), drx-ShortCycleTimer (optional), drx-HARQ-RTT-TimerDL, and drx-HARQ-RTT-TimerUL.

In addition, in a Uu DRX operation of the related art, drx-HARQ-RTT-TimerDL, drx-HARQ-RTT-TimerUL, drx-RetransmissionTimerDL, and drx-RetransmissionTimerUL are defined. When UE HARQ retransmission is performed, it is secured to make transition to a sleep mode during RTT timer (drx-HARQ-RTT-TimerDL, drx-HARQ-RTT-TimerUL) or to maintain an active state during Retransmission Timer (drx-RetransmissionTimerDL, drx-Retransmission-TimerUL).

In addition, for details of SL DRX, SL DRX-related contents of TS 38.321 and R2-2111419 may be referred to as the related art.

Meanwhile, the following Table 10 is a description related to the selection and re-selection of a side link relay UE in 3GPP TS 36.331. The disclosures of Table 10 are used as the related art in the present disclosure, and 3GPP TS 36.331 is referred to for the necessary details.

TABLE 10

| 5.10.11.4 Selection and reselection of sidelink relay UE |
| --- |
| A UE capable of sidelink remote UE operation that is configured by upper layers to search for a sidelink relay UE shall:<br>   1> if out of coverage on the frequency used for sidelink communication, as defined in TS 36.304 [4], clause 11.4; or<br>   1> if the serving frequency is used for sidelink communication and the RSRP measurement of the cell on which the<br>      UE camps (RRC_IDLE)/ the PCell (RRC_CONNECTED) is below threshHigh within remoteUE-Config :<br>      2> search for candidate sidelink relay UEs, in accordance with TS 36.133 [16]<br>      2> when evaluating the one or more detected sidelink relay UEs, apply layer 3 filtering as specified in 5.5.3.2<br>         across measurements that concern the same ProSe Relay UE ID and using the filterCoefficient in<br>         SystemInformationBlockType19 (in coverage) or the preconfigured filterCoefficient as defined in 9.3(out of<br>         coverage), before using the SD-RSRP measurement results;<br>   NOTE 1: The details of the interaction with upper layers are up to UE implementation.<br>      2> if the UE does not have a selected sidelink relay UE:<br>         3> select a candidate sidelink relay UE which SD-RSRP exceeds q-RxLevMin included in either<br>            reselectionInfoIC (in coverage) or reselectionInfoOoC (out of coverage) by minHyst;<br>      2> else if SD-RSRP of the currently selected sidelink relay UE is below q-RxLevMin included in either<br>         reselectionInfoIC (in coverage) or reselectionInfoOoC (out of coverage); or if upper layers indicate not to use<br>         the currently selected sidelink relay: (i.e. sidelink relay UE reselection):<br>         3> select a candidate sidelink relay UE which SD-RSRP exceeds q-RxLevMin included in either<br>            reselectionInfoIC (in coverage) or reselectionInfoOoC (out of coverage) by minHyst;<br>      2> else if the UE did not detect any candidate sidelink relay UE which SD-RSRP exceeds q-RxLevMin included<br>         in either reselectionInfoIC (in coverage) or reselectionInfoOoC (out of coverage) by minHyst:<br>         3> consider no sidelink relay UE to be selected;<br>   NOTE 2: The UE may perform sidelink relay UE reselection in a manner resulting in selection of the sidelink relay<br>         UE, amongst all candidate sidelink relay UEs meeting higher layer criteria, that has the best radio link<br>         quality. Further details, including interaction with upper layers, are up to UE implementation.<br>         5.10.11.5 Sidelink remote UE threshold conditions<br>A UE capable of sidelink remote UE operation shall:<br>   1> if the threshold conditions specified in this clause were not met:<br>      2> if threshHigh is not included in remoteUE-Config within SystemInformationBlockType19; or<br>      2> if threshHigh is included in remoteUE-Config within SystemInformationBlockType19; and the RSRP<br>         measurement of the PCell, or the cell on which the UE camps, is below threshHigh by hystMax (also included<br>         within remoteUE-Config):<br>         3> consider the threshold conditions to be met (entry);<br>   1> else:<br>      2> if threshHigh is included in remoteUE-Config within SystemInformationBlockType19; and the RSRP<br>         measurement of the PCell, or the cell on which the UE camps, is above threshHigh (also included within<br>         remoteUE-Config):<br>         3> consider the threshold conditions not to be met (leave); |

TABLE 11

| or<br>  -  ra-ContentionResolutionTimer (as described in clause5.1.5) or msgB-<br>      ResponseWindow (as described in clause 5.1.4a) is running; or<br>  -  a Scheduling Request is sent on PUCCH and is pending (as described in clause 5.4.4);<br>      or<br>  -  a PDCCH indicating a new transmission addressed to the C-RNTI of the MAC entity<br>      has not been received after successful reception of a Random Access Response for the<br>      Random Access Preamble not selected by the MAC entity among the contention-based<br>      Random Access Preamble (as described in clauses 5.1.4 and 5.1.4a).<br>When DRX is configured, the MAC entity shall:<br>   1>if a MAC PDU is received in a configured downlink assignment:<br>      2>start the drx-HARQ-RTT-TimerDL for the corresponding HARQ process in the first<br>         symbol after the end of the corresponding transmission carrying the DL HARQ<br>         feedback;<br>      2>stop the drx-RetransmissionTimerDL for the corresponding HARQ process.<br>   1>if a MAC PDU is transmitted in a configured uplink grant and LBT failure indication<br>      is not received from lower layers:<br>      2>start the drx-HARQ-RTT-TimerUL for the corresponding HARQ process in the first<br>         symbol after the end of the first transmission (within a bundle) of the corresponding<br>         PUSCH transmission;<br>      2>stop the drx-RetransmissionTimerUL for the corresponding HARQ process at the<br>         first transmission (within a bundle) of the corresponding PUSCH transmission.<br>   1>if a drx-HARQ-RTT-TimerDL expires:<br>      2>if the data of the corresponding HARQ process was not successfully decoded:<br>         3>start the drx-RetransmissionTimerDL for the corresponding HARQ process in<br>            the first symbol after the expiry of drx-HARQ-RTT-TimerDL. |

TABLE 11-continued

1>if a drx-HARQ-RTT-TimerUL expires:
    2>start the drx-RetransmissionTimerUL for the corresponding HARQ process in the
        first symbol after the expiry of drx-HARQ-RTT-TimerUL.
1>if a DRX Command MAC CE or a Long DRX Command MAC CE is received:
    2>stop drx-onDurationTimer for each DRX group;
    2>stop drx-InactivityTimer for each DRX group.
1>if drx-InactivityTimer for a DRX group expires:
    2>if the Short DRX cycle is configured:
        3>start or restart drx-ShortCycleTimer for this DRX group in the first symbol after
            the expiry of drx-InactivityTimer,
        3>use the Short DRX cycle for this DRX group.
    2>else:
        3>use the Long DRX cycle for this DRX group.
1>if a DRX Command MAC CE is received:
    2>if the Short DRX cycle is configured:
        3>start or restart drx-ShortCycleTimer for each DRX group in the first symbol after
            the end of DRX Command MAC CE reception;

TABLE 12

3>use the Short DRX cycle for each DRX group.
  2>else:
    3>use the Long DRX cycle for each DRX group.
  1>    if drx-ShortCycleTimer for a DRX group expires:
  2>use the Long DRX cycle for this DRX group.
  1>    if a Long DRX Command MAC CE is received:
  2>stop drx-ShortCycleTimer for each DRX group;
  2>use the Long DRX cycle for each DRX group.
  1>    if the Short DRX cycle is used for a DRX group, and [(SFN ×
10) + subframe number] modulo (drx-ShortCycle) = (drx-StartOffset)
modulo (drx-ShortCycle):
  2>start drx-onDurationTimer for this DRX group after drx-SlotOffset from the
    beginning of the subframe.
  1>    if the Long DRX cycle is used for a DRX group, and [(SFN ×
10) + subframe number] modulo (drx-LongCycle) = drx-StartOffset:
  2>if DCP monitoring is configured for the active DL BWP as specified in TS 38.213
    [6], clause 10.3:
    3>if DCP indication associated with the current DRX cycle received from lower
      layer indicated to start drx-onDurationTimer, as specified in TS 38.213 [6]; or
    3>if all DCP occasion(s) in time domain, as specified in TS 38.213 [6], associated
      with the current DRX cycle occurred in Active Time considering
      grants/assignments/DRX Command MAC CE/Long DRX Command MAC CE
      received and Scheduling Request sent until 4 ms prior to start of the last DCP
      occasion, or during a measurement gap, or when the MAC entity monitors for a
      PDCCH transmission on the search space indicated by recoverySearchSpaceId
      of the SpCell identified by the C-RNTI while the ra-Response Window is
      running (as specified in clause 5.1.4); or
    3>if ps-Wakeup is configured with value true and DCP indication associated with
      the current DRX cycle has not been received from lower layers:
      4>start drx-onDurationTimer after drx-SlotOffset from the beginning of the
        subframe.
  2>else:
    3>start drx-onDurationTimer for this DRX group after drx-SlotOffset from the
      beginning of the subframe.
NOTE 2:  In case of unaligned SFN across carriers in a cell group, the SFN of the
      SpCell is used to calculate the DRX duration.
  1>    if a DRX group is in Active Time:
  2>monitor the PDCCH on the Serving Cells in this DRX group as specified in TS
    38.213 [6];
  2>if the PDCCH indicates a DL transmission:
    3>start the drx-HARQ-RTT-TimerDL for the corresponding HARQ process in the
      first symbol after the end of the corresponding transmission carrying the DL
      HARQ feedback;
NOTE 3:  When HARQ feedback is postponed by PDSCH-to-HARQ_feedback timing
      indicating an inapplicable k1 value, as specified in TS 38.213 [6], the
      corresponding transmission opportunity to send the DL HARQ feedback is
      indicated in a later PDCCH requesting the HARQ-ACK feedback.
    3>stop the drx-RetransmissionTimerDL for the corresponding HARQ process.
    3>if the PDSCH-to-HARQ_feedback timing indicate an inapplicable k1 value as
      specified in TS 38.213 [6]:
      4>start the drx-RetransmissionTimerDL in the first symbol after the (end of the
        last) PDSCH transmission (within a bundle) for the corresponding HARQ
        process.
  2>if the PDCCH indicates a UL transmission:

TABLE 13

3>start the drx-HARQ-RTT-TimerUL for the corresponding HARQ process in the
 first symbol after the end of the first transmission (within a bundle) of the
 corresponding PUSCH transmission;
3>stop the drx-RetransmissionTimerUL for the corresponding HARQ process.
2>if the PDCCH indicates a new transmission (DL or UL) on a Serving Cell in this
 DRX group:
3>start or restart drx-InactivityTimer for this DRX group in the first symbol after
 the end of the PDCCH reception.
NOTE 3a:    A PDCCH indicating activation of SPS or configured grant type 2 is
 considered to indicate a new transmission.
2>if a HARQ process receives downlink feedback information and acknowledgement
 is indicated:
3>stop the drx-RetransmissionTimerUL for the corresponding HARQ process.
1>if DCP monitoring is configured for the active DL BWP as specified in TS 38.213 [6],
 clause 10.3; and
1>if the current symbol n occurs within drx-onDurationTimer duration; and
1>if drx-onDurationTimer associated with the current DRX cycle is not started as
 specified in this clause:
2>if the MAC entity would not be in Active Time considering
 grants/assignments/DRX Command MAC CE/Long DRX Command MAC CE
 received and Scheduling Request sent until 4 ms prior to symbol n when evaluating
 all DRX Active Time conditions as specified in this clause:
3>not transmit periodic SRS and semi-persistent SRS defined in TS 38.214 [7];
3>not report semi-persistent CSI configured on PUSCH;
3>if ps-TransmitPeriodicL1-RSRP is not configured with value true:
 4>not report periodic CSI that is L1-RSRP on PUCCH.
3>if ps-TransmitOtherPeriodicCSI is not configured with value true:
 4>not report periodic CSI that is not L1-RSRP on PUCCH.
1>else:
2>in current symbol n, if a DRX group would not be in Active Time considering
 grants/assignments scheduled on Serving Cell(s) in this DRX group and DRX
 Command MAC CE/Long DRX Command MAC CE received and Scheduling
 Request sent until 4 ms prior to symbol n when evaluating all DRX Active Time
 conditions as specified in this clause:
3>not transmit periodic SRS and semi-persistent SRS defined in TS 38.214 [7] in
 this DRX group;
3>not report CSI on PUCCH and semi-persistent CSI configured on PUSCH in this
 DRX group.
2>if CSI masking (csi-Mask) is setup by upper layers:
3>in current symbol n, if drx-onDurationTimer of a DRX group would not be
 running considering grants/assignments scheduled on Serving Cell(s) in this
 DRX group and DRX Command MAC CE/Long DRX Command MAC CE
 received until 4 ms prior to symbol n when evaluating all DRX Active Time
 conditions as specified in this clause; and
 4>not report CSI on PUCCH in this DRX group.
NOTE 4:    If a UE multiplexes a CSI configured on PUCCH with other overlapping
 UCI(s) according to the procedure specified in TS 38.213 [6] clause 9.2.5 and
 this CSI multiplexed with other UCI(s) would be reported on a PUCCH resource
 either outside DRX Active Time of the DRX group in which this PUCCH is
 configured or outside the on-duration period of the DRX group in which this
 PUCCH is configured if CSI masking is setup by upper layers, it is up to UE
 implementation whether to report this CSI multiplexed with other UCI(s).
Regardless of whether the MAC entity is monitoring PDCCH or not on the Serving Cells in
a DRX group, the MAC entity transmits HARQ feedback, aperiodic CSI on PUSCH, and
aperiodic SRS defined in TS 38.214 [7] on the Serving Cells in the DRX group when such
is expected.
The MAC entity needs not to monitor the PDCCH if it is not a complete PDCCH occasion
(e.g. the Active Time starts or ends in the middle of a PDCCH occasion).

In the past LTE L2 relay (FeD2D [36.746]), when a remote UE is SL-connected to a relay UE for a relay operation, the relay UE delivers a SIB to the remote UE. Currently, in the Rel-17 SL NR relay WI meeting, there is a discussion on whether the SIB needs to be transmitted even before the remote UE and the relay UE are SL-connected to each other, and Table 14 below is a part of TR 36.746 related thereto.

TABLE 14

5.1.2.3 System information reception for evolved ProSe Remote UE
The evolved ProSe UE-to-Network Relay UE supports relaying of system information for the linked evolv
ed. ProSe Remote UEs located in-coverage of E-UTRAN coverage as well as out of E-UTRAN coverage.
The eNB can configure the evolved ProSe UE-to-Network Relay UE whether it can forward the system
information to linked in-coverage evolved ProSe Remote UEs. Alternatively the evolved ProSe UE-to-Netw
ork Relay UE is expected to forward the system information to the in-coverage evolved ProSe Remote UE.
The linked evolved ProSe Remote UE utilizes the system information of the serving cell of the evolved ProS
e UE-to-Network Relay UE.
Not all system information is relayed to the linked evolved ProSe Remote UE via the evolved ProSe UE-t
o-Network Relay UE. Essential SIBs are required to be relayed from the evolved ProSe UE-to-Network R
elay UE to all linked evolved ProSe Remote UEs commonly. At least the following SIBs can be considered TABLE 14-continued asessential SIBs: MIB (SFN, bandwidth), SIB1 (PLMN, cell information), SIB2 (Access Barring
information), FeD2D SIB related info (e.g. SIB18/19 or new SIBs). Evolved ProSe UE-to-Network Relay
UE can optionally forward other SIBs (e.g. SIB10/11/12/13/14/15) depending on the linked evolved ProSe
Remote UEs.
   Editor's Note: It is FFS which other SIBs needs to be forwarded to the evolved ProSe Remote UE and
      what information is provided to the evolved ProSe UE-to-Network Relay UE to indicate which
      SIBs are needed by the evolved ProSe Remote UE.
The evolved ProSe UE-to-Network Relay UE is expected to purely forward the SIBs without changing the
information and format of the SIB. This approach is recommended. Alternatively, the evolved ProSe UE-to-
Network Relay UE can only forward a subset of information of the SIB to the evolved ProSe Remote UE.
   Editor's Note: It is FFS if there is a use case for the evolved ProSe UE-to-Network Relay UE forwarding
      only subset of information of the SIB to the evolved ProSe Remote UE.
An evolved ProSe UE-To-Network Relay UE forwards SIB over sidelink using broadcast/multi-cast.
   Editor's Note: It is FFS if unicast transmission is used for evolved ProSe UE-to-Network Relay UE
      forwarding SIB.
The system information is not delivered periodically to the evolved ProSe Remote UE, but only
when deemed necessary. The evolved ProSe UE-to-Network Relay UE can determine that SIB delivery is
deemed necessary for the evolved ProSe Remote UE when system information is updated.
   Editor's Note: Other reasons for the evolved ProSe UE-to-Network Relay UE determining that SIB
      delivery is deemed necessary are left for WI phase.

Table 15 below shows content related to selection and reselection of a sidelink relay UE in 3GPP TS 38.331. The content of Table 15 is used as the prior art of the present disclosure, and necessary details may be understood with reference to 3GPP TS 38.331. A specific architecture of the relay UE may be understood with reference to 3GPP TR 38.836.

TABLE 15

5.8.15.3 Selection and reselection of NR sidelink U2N Relay UE

A UE capable of NR sidelink U2N Remote UE operation that is configured by upper layers to
search for a NR sidelink U2N Relay UE shall:
  1>if the UE has no serving cell; or
  1>if the RSRP measurement of the cell on which the UE camps (for L2 and L3 U2N Remote
    UE in RRC_IDLE or RRC_INACTIVE)/ the PCell (for L3 U2N Remote UE in
    RRC_CONNECTED) is below threshHighRemote within sl-remoteUE-Config:
    2>if the UE does not have a selected NR sidelink U2N Relay UE; or
    2>if the UE has a selected NR sidelink U2N Relay UE, and SL-RSRP of the currently
      selected NR sidelink U2N Relay UE is available and is below sl-RSRP-Thresh; or
    2>if the UE has a selected NR sidelink U2N Relay UE, and SL-RSRP of the currently
      selected NR sidelink U2N Relay UE is not available, and SD-RSRP of the currently
      selected U2N Relay UE is below sl-RSRP-Thresh; or
  NOTE 1:   U2N Remote UE uses SL-RSRP measurements for relay reselection trigger
      evaluation when there is data transmission from U2N Relay UE to U2N Remote UE,
      and it is left to UE implementation whether to use SL-RSRP or SD-RSRP for relay
      reselection trigger evaluation in case of no data transmission from U2N Relay UE
      to U2N Remote UE. If SD-RSRP is used, the discovery procedure will be performed
      between the U2N Remote UE and the selected U2N Relay UE.
    2>if the UE has a selected NR sidelink U2N Relay UE, and upper layers indicate not to
      use the currently selected NR sidelink U2N Relay UE; or
    2>if the UE has a selected NR sidelink U2N Relay UE, and upper layers request the
      release of the PC5-RRC connection or when AS layer releases the PC5-RRC
      connection with the currently selected U2N Relay UE as specified in clause 5.8.9.5; or
    2>if the UE has a selected NR sidelink U2N Relay UE, and sidelink radio link failure is
      detected on the PC5-RRC connection with the current U2N Relay UE as specified in
      clause 5.8.9.3:
      3>perform NR sidelink discovery procedure as specified in clause 5.8.13 in order to
        search for candidate NR sidelink U2N Relay UEs;
        4>when evaluating the one or more detected NR sidelink U2N Relay UEs, apply
          layer 3 filtering as specified in 5.5.3.2 across measurements that concern the same
          U2N Relay UE ID and using the sl-FilterCoefficientRSRP in
          SystemInformationBlockType12 (if in RRC_IDLE/INACTIVE), the sl-
          FilterCoefficientRSRP in sl-ConfigDedicatedNR (if in RRC_CONNECTED) or
          the preconfigured sl-FilterCoefficientRSRP as defined in 9.3 (out of coverage),
          before using the SD-RSRP measurement results;
        4>consider a candidate NR sidelink U2N Relay UE for which SD-RSRP exceeds
          sl-RSRP-Thresh by sl-HystMin has met the AS criteria;
        4>consider one of the available suitable NR sidelink U2N relay UE(s) can be
          selected;
  NOTE 2:   A candidate NR sidelink U2N Relay UE which meets all AS layer criteria defined
      in 5.8.15.3 and higher layer criteria defined in TS 23.304 [65] can be regarded as
      suitable NR sidelink U2N Relay UE by the NR sidelink U2N Remote UE. If multiple
      suitable NR sidelink U2N Relay UEs are available, it is up to Remote UE TABLE 15-continued

| 5.8.15.3 Selection and reselection of NR sidelink U2N Relay UE |
| --- |
| implementation to choose one NR sidelink U2N Relay UE. The details of the interaction with upper layers are up to UE implementation.<br>NOTE 3:    For L2 U2N Remote UEs in RRC_IDLE/INACTIVE and L3 U2N Remote UEs, the cell (re)selection procedure and relay (re)selection procedure run independently. If both suitable cells and suitable NR sidelink U2N Relay UEs are available, it is up to NR sidelink U2N Remote UE implementation to select either a cell or a NR sidelink U2N Relay UE. Furthermore, L3 U2N Remote UE's selection on both cell and NR sidelink U2N Relay UE is also based on UE implementation.<br>    3>if the UE did not detect any candidate NR sidelink U2N Relay UE for which SD-RSRP exceeds sl-RSRP-Thresh by sl-HystMin:<br>        4>consider no NR sidelink U2N Relay UE to be selected. |

Figure 11:
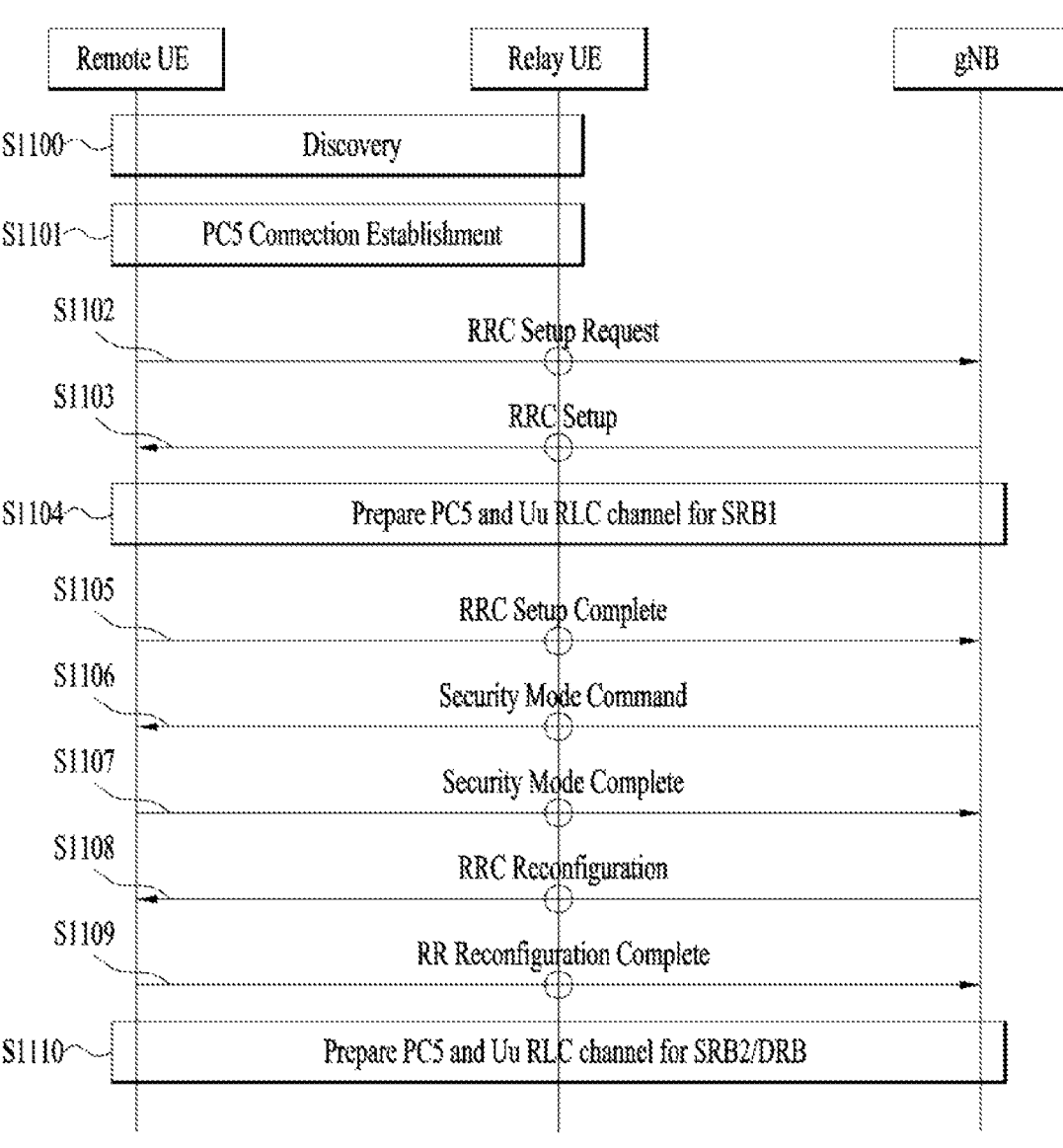
FIG. 11 shows a path switching procedure of a remote UE according to an embodiment of the present disclosure.
Figure 12:
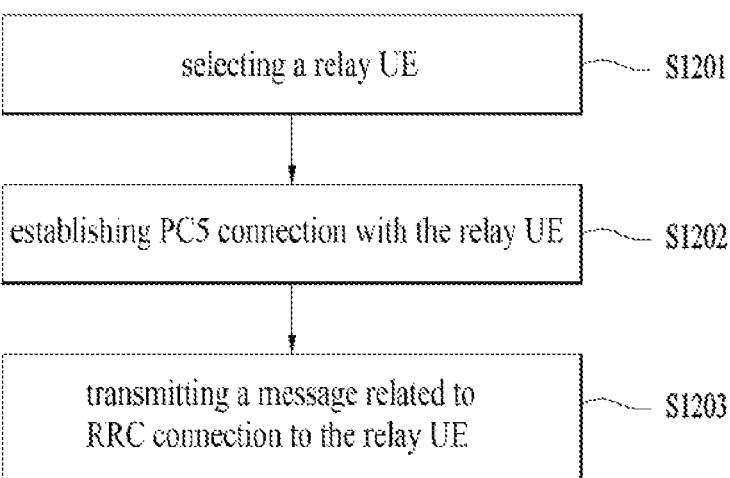

FIG. 11 shows a procedure during path switching from direct to indirect connection with a connection management, which is captured from the TR document (3GPP TR 38.836) related to Rel-17 NR SL. A remote UE needs to establish a PDU session/DRB thereof with a network before transmitting user plane data.

A PC5 unicast link establishment procedure in terms of PC5-RRC of Rel-16 NR V2X may be reused to establish a secure unicast link for L2 UE-to-Network relaying between a remote UE and a relay UE before the remote UE establishes Uu RRC connection with a network through the relay UE.

For both in-coverage and out-of-coverage, when the remote UE initiates a first RRC message to establish a connection with a gNB, a PC5 L2 configuration for transmission between the remote UE and the UE-to-Network Relay UE is based on the RLC/MAC configuration defined in the standard. The establishment of Uu SRB1/SRB2 and DRB of the remote UE complies with the legacy Uu configuration procedure for L2 UE-to-Network Relay.

An upper-level connection establishment procedure shown in FIG. 11 is applied to the L2 UE-to-Network Relay.

In step S1101, the remote and relay UE may perform a discovery procedure and may establish PC5-RRC connection based on the existing Rel-16 procedure.

In step S1102, the remote UE may transmit the first RRC message (i.e., RRCSetupRequest) for connection establishment with the gNB through the relay UE using the basic L2 configuration of PC5. The gNB may respond to the remote UE with an RRCSetup message. RRCSetup may be delivered to the remote UE using the default configuration of PC5. If the relay UE is not started in RRC_CONNECTED, connection establishment of the relay UE needs to be performed during message reception for the default L2 configuration of PC5. In this step, details for the relay UE to transmit the RRCSetupRequest/RRCSetup message to the remote UE may be discussed in the WI step.

In operation S1103, the gNB and the relay UE may perform a relay channel establishment procedure through Uu. According to the gNB configuration, the relay/remote UE may establish an RLC channel for relaying SRB1 to the remote UE through PC5. This step may prepare the relay channel for the SRB1.

In operation S1104, the remote UE may transmit a SRB1 message (e.g., RRCSetupComplete message) to the gNB through the relay UE using a SRB1 relay channel. The remote UE may be RRC-connected through Uu.

In operation S1105, the remote UE and gNB may establish security according to the legacy procedure, and a security message may be delivered through the relay UE.

In operation S1106, the gNB may establish an additional RLC channel between the gNB and the relay UE for traffic relay. According to the gNB configuration, the relay/remote UE may establish an additional RLC channel between the remote UE and the relay UE for traffic relay.

The gNB may transmit RRCReconfiguration to the remote UE through relay UE to configure relay SRB2/DRB. The remote UE may transmit RRCReconfigurationComplete as a response to the gNB through the relay UE.

In the case of L2 UE-to-Network relay other than the connection establishment procedure:

The RRC reconfiguration and RRC connection release procedure may reuse the legacy RRC procedure with the message content/configuration design left in the WI step.

The RRC connection re-establishment and the RRC connection resumption procedure may reuse the existing RRC procedure as a baseline in consideration of the connection establishment procedure of the L2 UE-to-Network Relay above to process a specific part of the relay along with the message content/configuration design. The message content/configuration may be defined later.

In the conventional RRC connection procedure, the UE may transmit RRCSetupRequest to the BS, and the UE may operate a T300 timer until the RRCSetup message is received. If the RRCSetup message is not received from the BS until T300 expires, the UE may determine that the corresponding RRC connection fails, and may reset the related MAC operation. Table 16 below shows content disclosed in the standard document TS 38.331 related to expiration of the T300 timer, and is used as the prior art of the present disclosure.

TABLE 16

| 5.3.3.7 T300 expiry |
| --- |
| The UE shall:<br>    1> if timer T300 expires:<br>        2> reset MAC, release the MAC configuration and re-establish RLC for all RBs that are established;<br>        2> if the UE supports RRC Connection Establishment failure with temporary offset and the T300 has expired a consecutive connEstFailCount times on the same cell for which connEstFailureControl is included in SIB1:<br>            3> for a period as indicated by connEstFailOffsetValidity:<br>                4> use connEstFailOffset for the parameter Qoffsettemp for the concerned cell when performing cell selection and reselection according to TS 38.304 [20] and TS 36.304 [27]; |

TABLE 16-continued

NOTE 1: When performing cell selection, if no suitable or acceptable cell can be found, it is up to UE
     implementation whether to stop using connEstFailOffset for the parameter Qoffsettemp during
     connEstFailOffsetValidity for the concerned cell.
  2> if the UE has connection establishment failure information or connection resume failure information
     available in VarConnEstFailReport and if the RPLMN is not equal to plmn-identity stored in
     VarConnEstFailReport, or
  2> if the cell identity of current cell is not equal to the cell identity stored in measResultFailedCell in
     VarConnEstFailReport:
    3> reset the numberOfConnFail to 0;
  2> clear the content included in VarConnEstFailReport except for the numberOfConnFail, if any;
  2> store the following connection establishment failure information in the VarConnEstFailReport by setting its
     fields as follows:
    3> set the plmn-Identity to the PLMN selected by upper layers (see TS 24.501 [23]) from the PLMN(s)
      included in the plmn-IdentityInfoList in SIB1;
    3> set the measResultFailedCell to include the global cell identity, tracking area code, the cell level and
      SS/PBCH block level RSRP, and RSRQ, and SS/PBCH block indexes, of the failed cell based on the
      available SSB measurements collected up to the moment the UE detected connection establishment
      failure;
    3> if available, set the measResultNeighCells, in order of decreasing ranking-criterion as used for cell re-
      selection, to include neighbouring cell measurements for at most the following number of neighbouring
      cells: 6 intra-frequency and 3 inter-frequency neighbours per frequency as well as 3 inter-RAT
      neighbours, per frequency/ set of frequencies per RAT and according to the following:
      4> for each neighbour cell included, include the optional fields that are available;
NOTE 2: The UE includes the latest results of the available measurements as used for cell reselection evaluation,
     which are performed in accordance with the performance requirements as specified in TS 38.133 [14].
    3> if available, set the locationInfo as follows:
      4> if available, set the commonLocationInfo to include the detailed location information:
      4> if available, set the bt-LocationInfo to include the Bluetooth measurement results, in order of
        decreasing RSSI for Bluetooth beacons;
      4> if available, set the wlan-LocationInfo to include the WLAN measurement results, in order of
        decreasing RSSI for WLAN APs;
      4> if available, set the sensor-LocationInfo to include the sensor measurement results as follows;
       5> if available, include the sensor-MeasurementInformation;
       5> if available, include the sensor-MotionInformation;
NOTE 3: Which location information related configuration is used by the UE to make the locationInfo available for
     inclusion in the VarConnEstFailReport is left to UE implementation.
    3> set perRAInfoList to indicate the performed random access procedure related information as specified in
      5.7.10.5;
    3> if the numberOfConnFail is smaller than 8:
      4> increment the numberOfConnFail by 1;
  2> inform upper layers about the failure to establish the RRC connection, upon which the procedure ends;
The UE may discard the connection establishment failure or connection resume failure information, i.e. release the UE
vaariable VarConnEstFailReport, 48 hours after the last connection establishment failure is detected In the sidelink relay, establishment of an RRC connection of the remote UE with the BS may be somewhat different from the conventional RRC connection establishment between the UE and the BS or RRC connection establishment of the relay UE for the relay UE itself. As described in detail in the following embodiment, the remoteUE may establish sidelink connection with the relay UE, and may then transmit/deliver RRCSetupRequest for RRC connection to the relay UE. However, when the relay UE is not in the RRC connected state but in the RRC IDLE state, a problem may occur if the same T300 timer as that of a conventional general UE or relay UE is used. This is because when the relay UE is IDLE/INACTIVE, a time for the relay UE to establish connection with the BS may take longer than a time required for the general UE to establish connection with the BS. That is, when the remote UE delivers/transmits RRCSetupRequest to the relay UE, the relay UE in RRC IDLE/INACTIVE needs to first establish RRC connection with the BS, and thus needs more time for the relay UE to establish connection with the BS than the case in which the general UE or the relay UE establishes RRC connection therefor not for the remote UE. Accordingly, hereinafter, embodiments according to the present disclosure for overcoming these problems will be described in detail.

The remote UE according to an embodiment may select a relay UE, and the remote UE may establish PC5 connection with the relay UE. Thereafter, the remote UE may transmit a message related to RRC connection to the relay UE.

Here, the remote UE may initiate one or more timers related to RRC connection with the BS, and the one or more timers may be different from a first timer used when the remote UE performs direct RRC connection procedure with the BS. Specifically, the one or more timers may include a second timer related to determining whether the remote UE establishes RRC connection with the BS. The second timer may have a larger value than the first timer as a timer expiration value. That is, the T300 timer used by the remote UE may have a larger value than the T300 timer used by a general UE, and in this aspect, the T300 for the remote UE may need to be newly defined. Since T300 is a value transmitted through SIB, T300 for remote UE may need to be added to SIB information.

This timer may start when a message related to the RRC connection is transmitted. The remote UE may stop the second timer upon receiving the RRCsetup message from the relay. The remote UE may stop the second timer when performing relay reselection. That is, the second timer may be stopped when receiving the RRCsetup message or performing relay reselection. Subsequently, the remote UE may consider RRC connection failure based on not receiving the RRCsetup message from the relay UE until the second timer expires. The remote UE may reset a MAC-related operation related to RRC connection when RRC connection failure is considered.

The above-described configuration may prevent a situation in which an appropriate time is not ensured due to a time required for RRC connection of the relay UE in RRC IDLE and the RRC connection is improperly considered to fail when the above-described remote UE uses the conventional timer without change.

Figure 13:
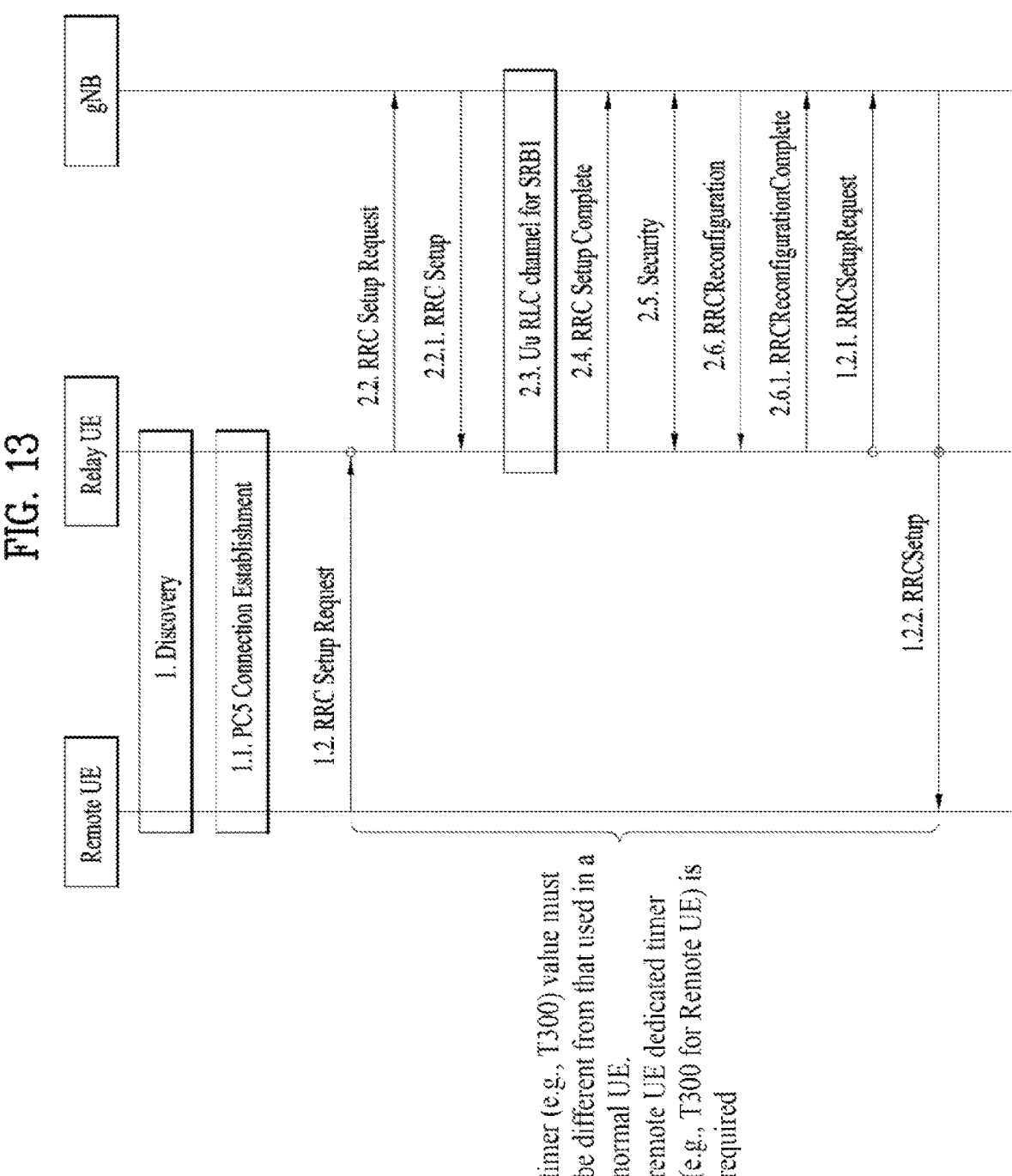

The above embodiment relates to a case in which the relay UE in an IDLE/INACTIVE state attempts connection with the BS after receiving the RRCSetupRequest message from the remote UE. FIG. 13 shows a flowchart related to the above disclosure, which will be described in detail below with reference to FIG. 13. The following description may be used together with the above embodiment as long as it does not conflict with the above embodiment.

The remote UE and the relay UE may establish PC5-S/PC5-RRC connection (Step 1 of FIG. 13). The remote UE may deliver the RRCSetupRequest message for connection with the BS to the relay UE (Step 1.2 of FIG. 13). The corresponding message may be delivered in the form of an SL message, and the relay UE that receives the message may not know whether the corresponding message is the RRC-SetupRequest message. However, the RRCSetupRequest is delivered using SRB0 of a PC5 link, and thus when the relay UE receives the message using the SRB0, the relay UE may implicitly know that the corresponding message is the RRCSetupRequest message (i.e., a first message transmitted toward the BS from the remote UE). The relay UE in an IDLE/INACTIVE state, which receives the message, is not in the CONNECTED state with the BS, and thus may store the RRCSetupRequest message received from the remote UE once and may perform an operation to establish connection with the BS (Step 2.2 of FIG. 13).

When the relay UE and the BS complete the RRCSetupRequest/RRCSetup step, an RLC channel for SRB1 of the Uu link may be formed (Step 2.3 of FIG. 13). After completely forming the RLC channel, the relay UE may transmit the RRCSetupComplete message to the BS (Step 2.4 of FIG. 13) and may only perform security configuration (Step 2.5 of FIG. 13). After completing the security configuration, the BS may perform RRCReconfiguration/RRCReconfigurationComplete with the relay UE (Steps 2.6 to 2.6.1 of FIG. 13).

When the relay UE and the BS complete connection, the relay UE may deliver the message (e.g., RRCSetupReugest message) received from the remote UE, which is stored in the relay UE, to the BS. In this case, through which bearer the RRCSetupReugest message of the remote UE is delivered may be included in the RRCReconfiguration received from the BS. In order to include the configuration (for example, bearer information) for delivering RRCSetupRequest and other messages received from the remote UE in the RRCReconfiguartion delivered by the base station, indication indicating that the relay UE is a relay UE may be included in a message such as RRCSetupRequest or RRCSetupComplete delivered to the BS by the BS. This is because, only when the relay UE knows whether the relay UE is a relay UE or a normal UE, it is possible to configure this.

As described above, in the Uu link, the normal UE or the relay UE may transmit the RRCSetupRequest to the BS, and the UE may operate the second timer as described above, not the conventional T300 timer until receiving the RRCSetup message.

The remote UE may start the second timer at a moment at which the 'RRCSetupRequest' message is delivered to the relay UE, and may stop the second timer when receiving 'RRCSetup'/'RRCReject' through the relay UE. When the UE does not receive the RRCSetup message from the BS until T300 expires, the UE may determine that corresponding RRC connection fails and may reset a related MAC operation.

As another example of use of the second timer, the remote UE may be allocated an additional time even if T300 expires differently from the normal UE. That is, even if the T300 expires, the normal UE may perform a series of operations (e.g., MAC reset or RRC connection establishment failure declaration) that are performed after T300 expires only when the additional time expires. In this case, the additional time used in the remote UE may be information included in SIB, or may be a pre-configured value.

In the above description, a remote UE may include at least one processor, and at least one computer memory operatively connected to the at least one processor and configured to store instructions that when executed causes the at least one processor to perform operations, and in this case, the operations may include selecting a relay UE, establishing PC5 connection with the relay UE, and transmitting a message related to RRC connection to the relay UE, the remote UE may initiate one or more timers related to RRC connection with a BS, and the one or more timers may be different from a first timer used when the remote UE performs a direct RRC connection procedure with the BS.

The remote UE may communicate with at least one of another UE, a UE related to an autonomous vehicle, a BS, or a network.

In a processor for performing operations for a relay UE, the operations may include selecting a relay UE, establishing PC5 connection with the relay UE, and transmitting a message related to RRC connection to the relay UE, the remote UE may initiate one or more timers related to RRC connection with a BS, and the one or more timers may be different from a first timer used when the remote UE performs a direct RRC connection procedure with the BS.

In a non-volatile computer-readable storage medium for storing at least one computer program including at least one instruction for causing at least one processor to perform operations for a relay user equipment (UE) when being executed by the at least one processor, the operations may include selecting a relay UE, establishing PC5 connection with the relay UE, and transmitting a message related to RRC connection to the relay UE, the remote UE may initiate one or more timers related to RRC connection with a BS, and the one or more timers may be different from a first timer used when the remote UE performs a direct RRC connection procedure with the BS.

Figure 14:
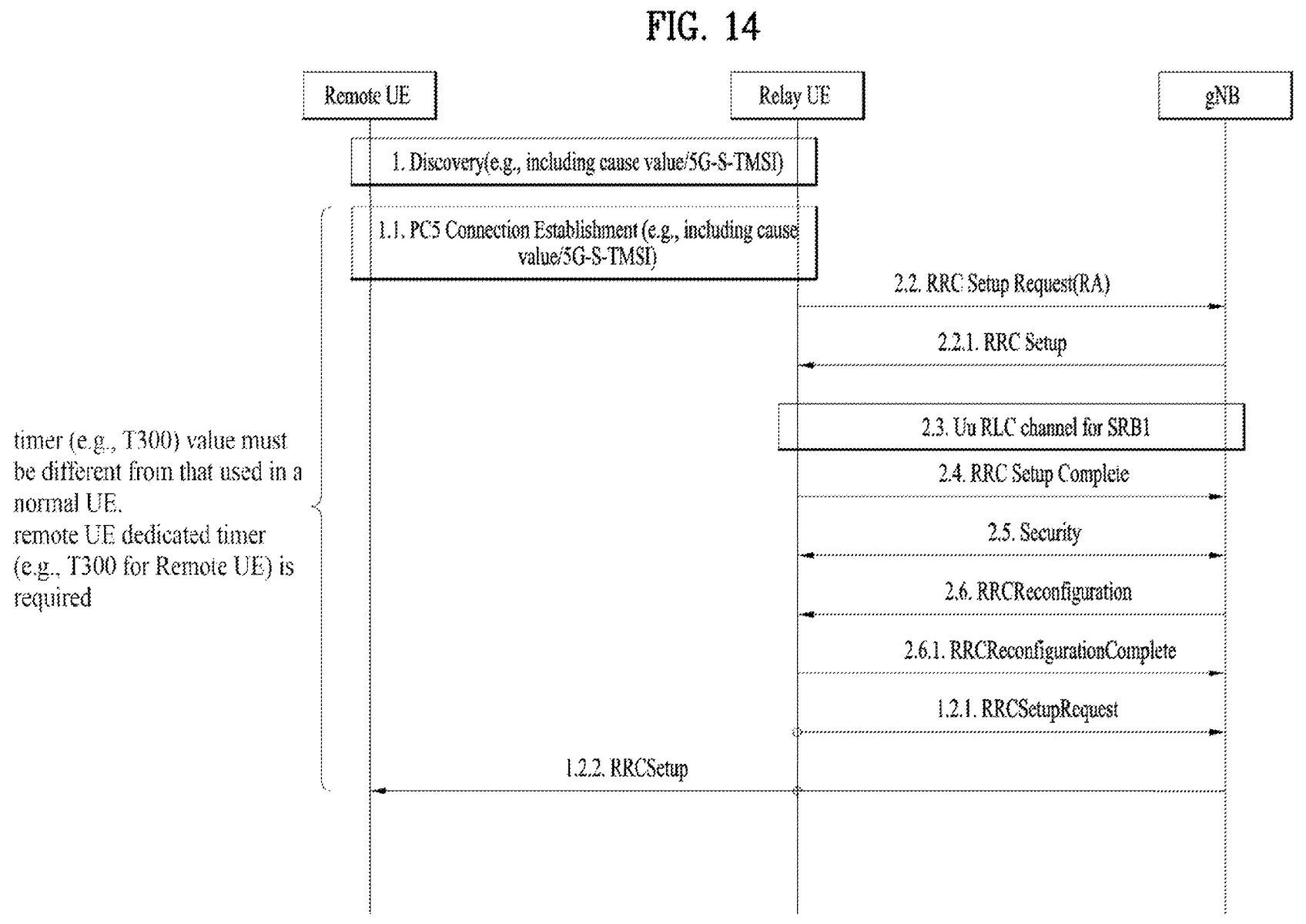

FIG. 14 shows the case in which a relay UE in an IDLE/INACTIVE state attempts CONNECTION with a BS when establishing PC5-S/PC5-RRC connection for relaying with a remote UE.

That is, even if the remote UE does not perform RRC-SetupRequest through the relay UE, when the remote UE establishes SL connection for relaying with the relay UE, the relay UE may perform an RRC CONNECTED state (connection procedure). Also, even if the remote UE does not transmit the RRCSetupRequest message to the BS, when the remote UE establishes PC5-S/PC5-RR connection with the relay UE for a relaying operation, the relay UE may implicitly consider this as the case in which the remote UE attempts a RRC CONNECTED state with the BS to switch the current state to the CONNECTED state and may simultaneously perform CONNECTION (connection procedure) for the remote UE, an example of which is shown in FIG. 14 below.

For example, the RRCSetupRequest message delivered to the BS by the remote UE may include CauseValue and 5G-S-TMSI values. Thus, when transmitting the message including the CauseValue and 5G-S-TMSI values during a procedure in which the remote UE delivers a discovery message to the relay UE or a PC5 connection establishment procedure, the relay UE may perform RRCSetupRequest on behalf of the remote UE (Step 1.2 of FIG. 14). That is, when the remote UE transmits the message including the CauseValue and 5G-S-TMSI values for RRC CONNECTION of the remote UE to the relay UE in a step of establishing PC5-S/PC5-RRC connection with the relay UE, the relay UE may consider this as the case in which the remote UE attempts to establish CONNECTION with the BS. Thus, when the relay UE that receives CauseValue and 5G-S-TMSI information from the remote UE is in the RRC CONNECTED state, the relay UE may generate an RRCSetupRequest message on behalf of the remote UE and may transmit the message to the BS. When the relay UE is in the RRC IDLE/INACTIVE state, the relay UE may establish RRC CONNECTION with the BS and may then transmit the RRCSetupRequest message for the remote UE to the BS using the CauseValue and 5G-S-TMSI message received from the remote UE.

For this operation, the remote UE may need another timer similar to a function of the conventional T300 timer described above. That is, a timer to be used to determine whether connection with the BS is successfully established or fails may be required. Start of the timer may be a time when the remote UE transmits the CauseValue and 5G-S-TMSI values thereof to the relay UE (e.g., a time when a response message to the discovery message is transmitted, or a time when the PC5-S message is transmitted), and an ending time may be a time when the RRCSetup message is received from the BS through the relay UE. In addition, in consideration of the time required for the relay UE in the IDLE/INACTIVE state to enter the CONNECTED state, the time period needs to be longer than the time required for the normal UE to transmit the RRCSetupRequest message and to receive the RRCSetup message.

Figure 15:
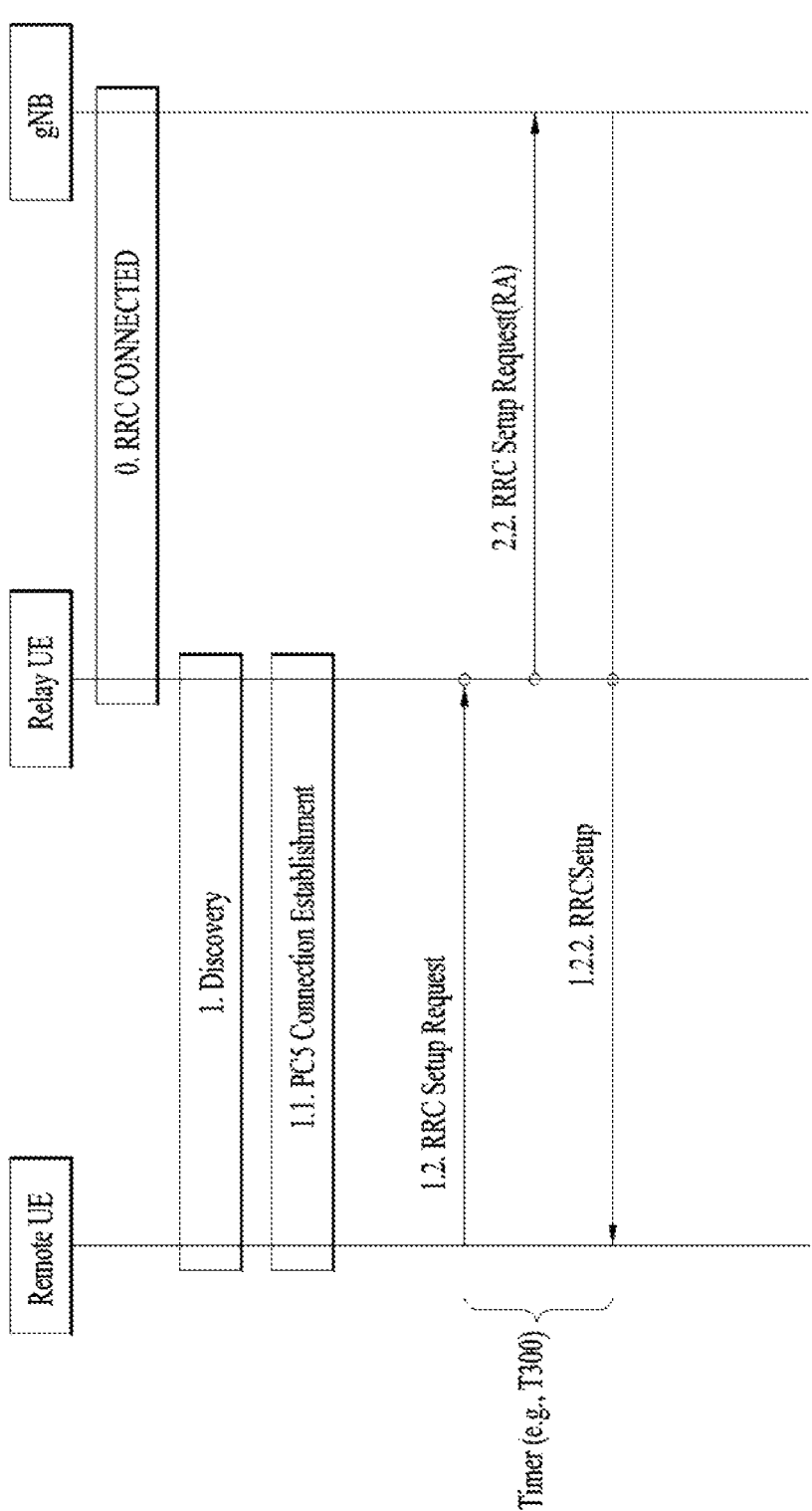

FIG. 15 shows the case in which a relay UE in a CONNECTED state establishes PC5-S/PC5-RRC connection for relaying with a remote UE and attempts CONNECTION establishment with a BS.

The drawing shows a procedure in which, when the relay UE is RRC connected, the remote UE performs connection establishment. The remote UE that establishes PC5 connection with the relay UE may transmit the 'RRCSetupRequest' message to the relay UE, and the RRC CONNECTED relay UE may forward the message to the gNB. The gNB that receives the message may deliver the 'RRCSetup'/'RRCReject' message to the remote UE through the relay UE.

As described above, according to the current T300 operation defined in TS 38.331, the remote UE may start the T300 timer at a moment when the 'RRCSetupRequest' message is delivered to the relay UE, and may stop the T300 timer when receiving the 'RRCSetup'/'RRCReject' through the relay UE. However, since the 'RRCSetupRequest' message transmitted by the remote UE is delivered to the gNB through the relay UE, the gNB may not be capable of knowing an exact time when the T300 timer of the remote UE starts. That is, ambiguity occurs between a T300 timer used by the remote UE and a T300 timer used by the gNB, and may cause an increase in the number of failures in RRC connection establishment of the remote UE.

As a time alignment method for RRC connection establishment between the remote UE and the gNB, the following may be considered. For example, a time stamp may be stamped at a time when the remote UE triggers the 'RRC- SetupRequest' message, and the gNB receiving the message may calculate the remaining time to transmit the 'RRCSetup' message. In addition, the 'RRCSetup' message delivered by the gNB to the remote UE needs to be transmitted in consideration of a time margin delivered by the relay UE to the remote UE through SL. To this end, the gNB may inform the relay UE of the remaining time margin required to deliver the RRCSetup message, and the relay UE needs to select a resource within the remaining time margin.

Examples of Communication Systems Applicable to the Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 16:
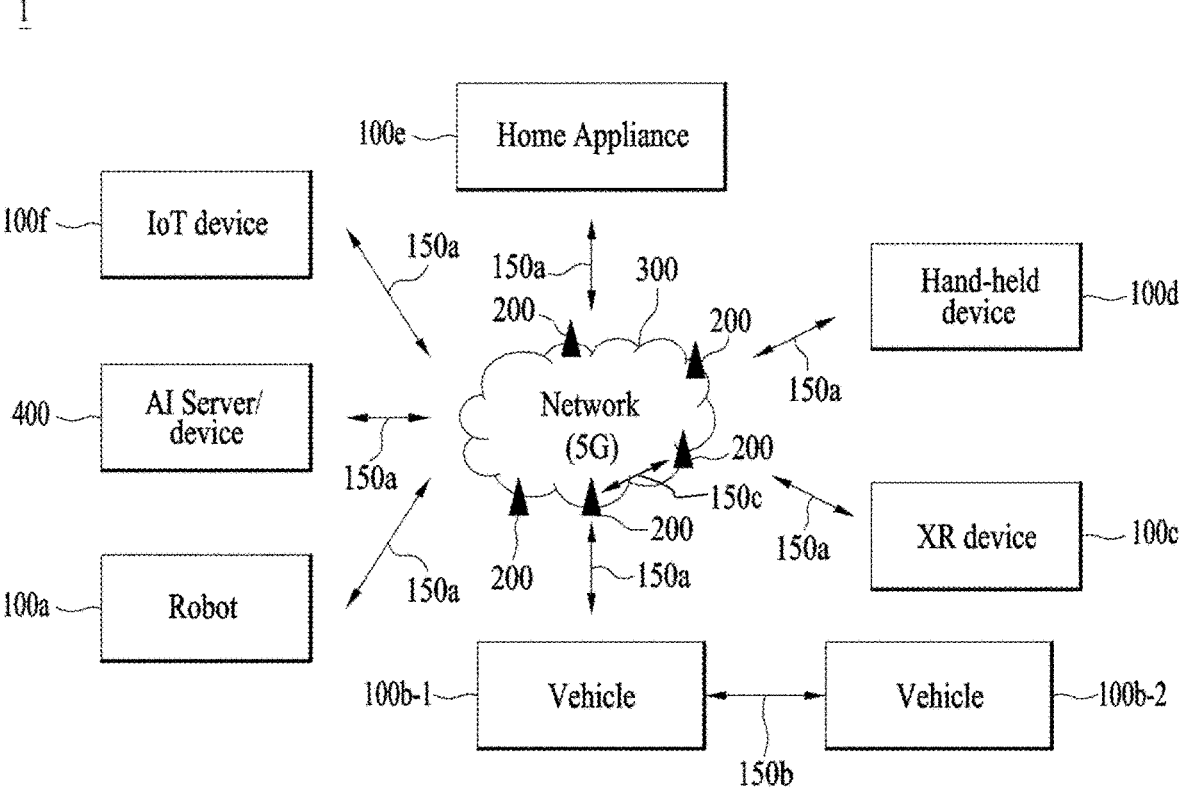

FIG. 16 illustrates a communication system 1 applied to the present disclosure.

Referring to FIG. 16, a communication system 1 applied to the present disclosure includes wireless devices, BSs, and a network. Herein, the wireless devices represent devices performing communication using RAT (e.g., 5G NR or LTE) and may be referred to as communication/radio/5G devices. The wireless devices may include, without being limited to, a robot 100a, vehicles 100b-1 and 100b-2, an extended reality (XR) device 100c, a hand-held device 100d, a home appliance 100e, an Internet of things (IoT) device 100f, and an artificial intelligence (AI) device/server 400. For example, the vehicles may include a vehicle having a wireless communication function, an autonomous driving vehicle, and a vehicle capable of performing communication between vehicles. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200 may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. V2V/V2X communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as UL/DL communication 150a, sidelink communication 150b (or, D2D communication), or inter BS communication (e.g. relay, integrated access backhaul (IAB)). The wireless devices and the BSs/ the wireless devices may transmit/receive radio signals to/from each other through the wireless communication/ connections 150a and 150b. For example, the wireless communication/connections 150a and 150b may transmit/ receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices Applicable to the Present Disclosure

Figure 17:
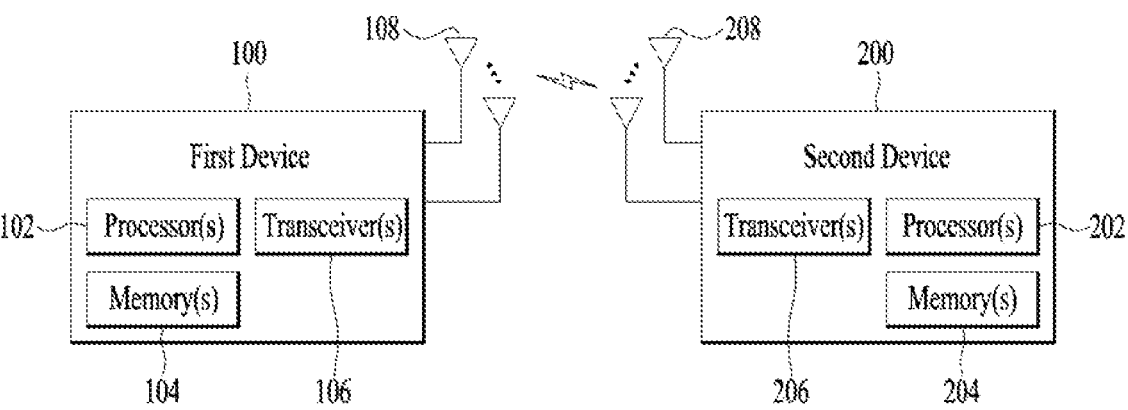

FIG. 17 illustrates wireless devices applicable to the present disclosure.

Referring to FIG. 17, a first wireless device 100 and a second wireless device 200 may transmit radio signals through a variety of RATs (e.g., LTE and NR). Herein, {the first wireless device 100 and the second wireless device 200} may correspond to {the wireless device 100a~100f and the BS 200} and/or {the wireless device 100a~100f and the wireless device 100a~100f} of FIG. 16.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowchart disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor (s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor (s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/ circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more service data unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers

106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 18:
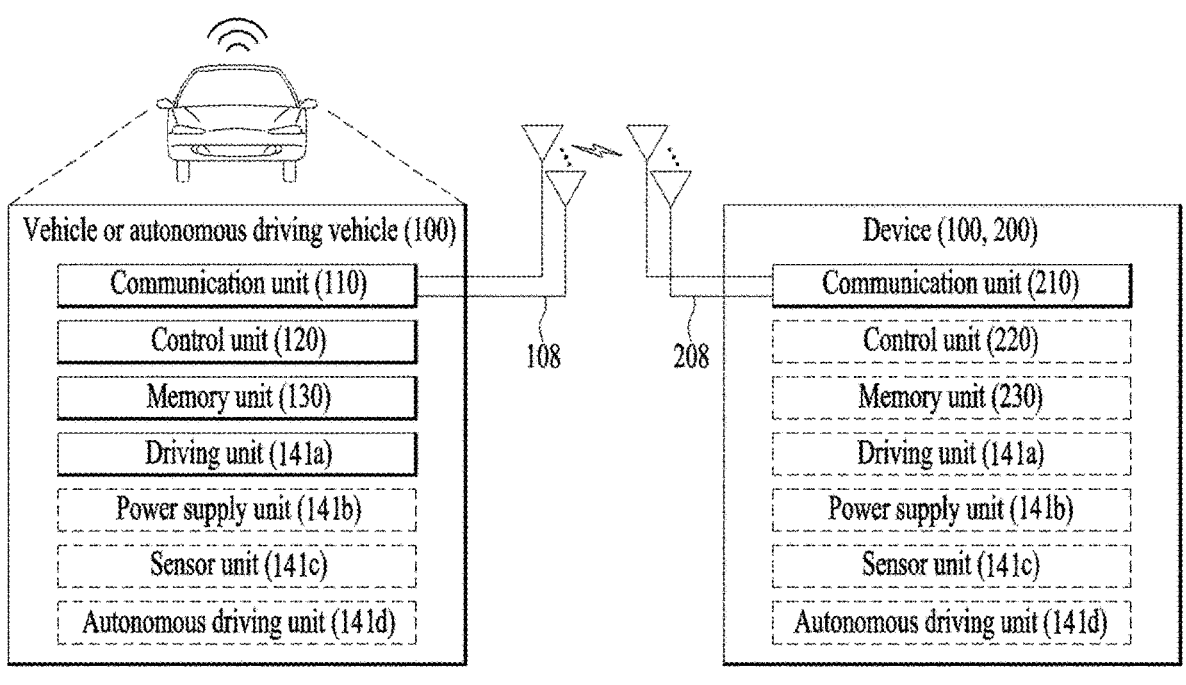

Examples of a Vehicle or an Autonomous Driving Vehicle Applicable to the Present Disclosure FIG. 18 illustrates a vehicle or an autonomous driving vehicle applied to the present disclosure. The vehicle or autonomous driving vehicle may be implemented by a mobile robot, a car, a train, a manned/unmanned aerial vehicle (AV), a ship, etc.

Referring to FIG. 18, a vehicle or autonomous driving vehicle 100 may include an antenna unit 108, a communication unit 110, a control unit 120, a driving unit 141*a*, a power supply unit 141*b*, a sensor unit 141*c*, and an autonomous driving unit 141*d*. The antenna unit 108 may be configured as a part of the communication unit 110.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 141*a* may cause the vehicle or the autonomous driving vehicle 100 to drive on a road. The driving unit 141*a* may include an engine, a motor, a powertrain, a wheel, a brake, a steering device, etc. The power supply unit 141*b* may supply power to the vehicle or the autonomous driving vehicle 100 and include a wired/wireless charging circuit, a battery, etc. The sensor unit 141*c* may acquire a vehicle state, ambient environment information, user information, etc. The sensor unit 141*c* may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 141*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 141*d* may generate an autonomous driving path and a driving plan from the obtained data. The control unit 120 may control the driving unit 141*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 141*c* may obtain a vehicle state and/or surrounding environment information. The autonomous driving unit 141*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Examples of a Vehicle and AR/VR Applicable to the Present Disclosure

FIG. 19 illustrates a vehicle applied to the present disclosure. The vehicle may be implemented as a transport means, an aerial vehicle, a ship, etc.

Referring to FIG. 19, a vehicle 100 may include a communication unit 110, a control unit 120, a memory unit 130, an I/O unit 140*a*, and a positioning unit 140*b*.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140*a* may output an AR/VR object based on information within the memory unit 130. The I/O unit 140*a* may include an HUD. The positioning unit 140*b* may acquire information about the position of the vehicle 100. The position information may include information about an absolute position of the vehicle 100, information about the position of the vehicle 100 within a traveling lane, acceleration information, and information about the position of the vehicle 100 from a neighboring vehicle. The positioning unit 140*b* may include a GPS and various sensors.

As an example, the communication unit 110 of the vehicle 100 may receive map information and traffic information from an external server and store the received information in the memory unit 130. The positioning unit 140*b* may obtain the vehicle position information through the GPS and various sensors and store the obtained information in the memory unit 130. The control unit 120 may generate a virtual object based on the map information, traffic information, and vehicle position information and the I/O unit 140*a* may display the generated virtual object in a window in the vehicle (1410 and 1420). The control unit 120 may determine whether the vehicle 100 normally drives within a traveling lane, based on the vehicle position information. If the vehicle 100 abnormally exits from the traveling lane, the control unit 120 may display a warning on the window in the vehicle through the I/O unit 140*a*. In addition, the control unit 120 may broadcast a warning message regarding driving abnormity to neighboring vehicles through the communication unit 110. According to situation, the control unit 120 may transmit the vehicle position information and the information about driving/vehicle abnormality to related organizations.

Examples of an XR Device Applicable to the Present Disclosure

Figure 20:
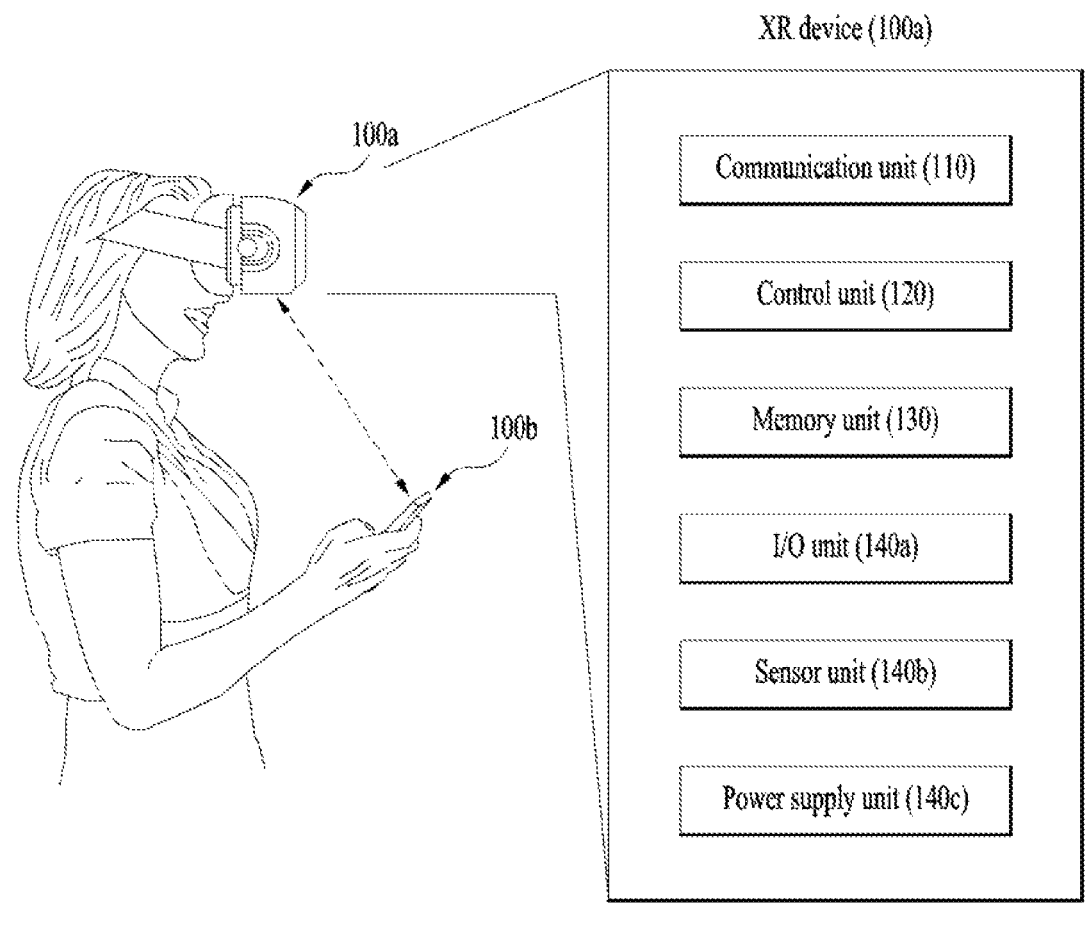

FIG. 20 illustrates an XR device applied to the present disclosure. The XR device may be implemented by an HMD, an HUD mounted in a vehicle, a television, a smart-phone, a computer, a wearable device, a home appliance, a digital signage, a vehicle, a robot, etc.

Referring to FIG. 20, an XR device 100*a* may include a communication unit 110, a control unit 120, a memory unit 130, an I/O unit 140*a*, a sensor unit 140*b*, and a power supply unit 140*c*.

The communication unit 110 may transmit and receive signals (e.g., media data and control signals) to and from external devices such as other wireless devices, hand-held devices, or media servers. The media data may include video, images, and sound. The control unit 120 may perform various operations by controlling constituent elements of the XR device 100*a*. For example, the control unit 120 may be configured to control and/or perform procedures such as video/image acquisition, (video/image) encoding, and metadata generation and processing. The memory unit 130 may store data/parameters/programs/code/commands needed to drive the XR device 100*a*/generate XR object. The I/O unit 140*a* may obtain control information and data from the exterior and output the generated XR object. The I/O unit 140*a* may include a camera, a microphone, a user input unit, a display unit, a speaker, and/or a haptic module. The sensor unit 140*b* may obtain an XR device state, surrounding environment information, user information, etc. The sensor unit 140*b* may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit 140*c* may supply power to the XR device 100*a* and include a wired/wireless charging circuit, a battery, etc.

For example, the memory unit 130 of the XR device 100*a* may include information (e.g., data) needed to generate the XR object (e.g., an AR/VR/MR object). The I/O unit 140*a* may receive a command for manipulating the XR device 100*a* from a user and the control unit 120 may drive the XR device 100*a* according to a driving command of a user. For example, when a user desires to watch a film or news through the XR device 100*a*, the control unit 120 transmits content request information to another device (e.g., a hand-held device 100*b*) or a media server through the communication unit 130. The communication unit 130 may download/stream content such as films or news from another device (e.g., the hand-held device 100*b*) or the media server to the memory unit 130. The control unit 120 may control and/or perform procedures such as video/image acquisition, (video/image) encoding, and metadata generation/processing with respect to the content and generate/output the XR object based on information about a surrounding space or a real object obtained through the I/O unit 140*a*/sensor unit 140*b*.

The XR device 100*a* may be wirelessly connected to the hand-held device 100*b* through the communication unit 110 and the operation of the XR device 100*a* may be controlled by the hand-held device 100*b*. For example, the hand-held device 100*b* may operate as a controller of the XR device 100*a*. To this end, the XR device 100*a* may obtain information about a 3D position of the hand-held device 100*b* and generate and output an XR object corresponding to the hand-held device 100*b*.

Examples of a Robot Applicable to the Present Disclosure

Figure 21:
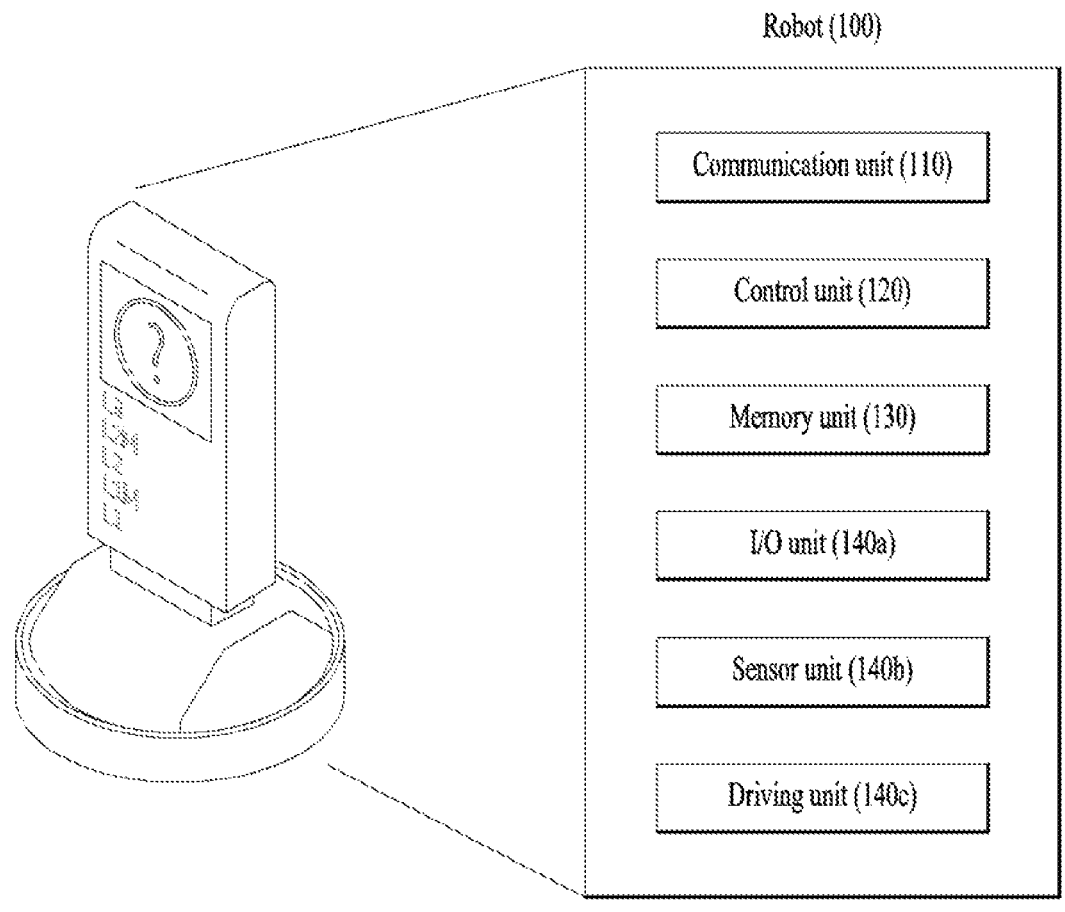

FIG. 21 illustrates a robot applied to the present disclosure. The robot may be categorized into an industrial robot, a medical robot, a household robot, a military robot, etc., according to a used purpose or field.

Referring to FIG. 21, a robot 100 may include a communication unit 110, a control unit 120, a memory unit 130, an I/O unit 140a, a sensor unit 140b, and a driving unit 140c.

The communication unit 110 may transmit and receive signals (e.g., driving information and control signals) to and from external devices such as other wireless devices, other robots, or control servers. The control unit 120 may perform various operations by controlling constituent elements of the robot 100. The memory unit 130 may store data/parameters/programs/code/commands for supporting various functions of the robot 100. The I/O unit 140a may obtain information from the exterior of the robot 100 and output information to the exterior of the robot 100. The I/O unit 140a may include a camera, a microphone, a user input unit, a display unit, a speaker, and/or a haptic module. The sensor unit 140b may obtain internal information of the robot 100, surrounding environment information, user information, etc. The sensor unit 140b may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, etc. The driving unit 140c may perform various physical operations such as movement of robot joints. In addition, the driving unit 140c may cause the robot 100 to travel on the road or to fly. The driving unit 140c may include an actuator, a motor, a wheel, a brake, a propeller, etc.

Example of AI device to which the present disclosure is applied.

Figure 22:
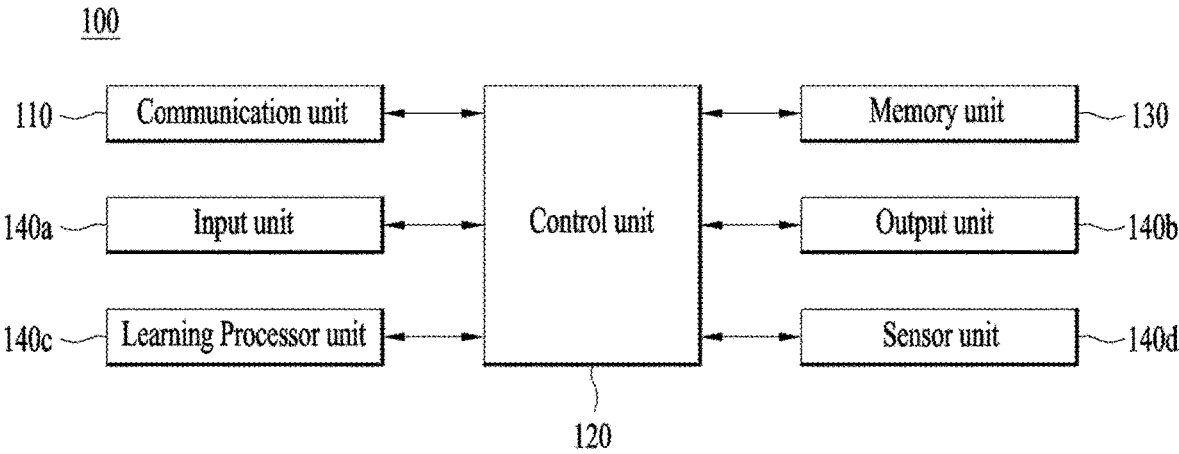

FIG. 22 illustrates an AI device applied to the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, etc.

Referring to FIG. 22, an AI device 100 may include a communication unit 110, a control unit 120, a memory unit 130, an I/O unit 140a/140b, a learning processor unit 140c, and a sensor unit 140d.

The communication unit 110 may transmit and receive wired/radio signals (e.g., sensor information, user input, learning models, or control signals) to and from external devices such as other AI devices (e.g., 100a~100f, 200, or 400 of FIG. 16) or an AI server (e.g., 400 of FIG. 16) using wired/wireless communication technology. To this end, the communication unit 110 may transmit information within the memory unit 130 to an external device and transmit a signal received from the external device to the memory unit 130.

The control unit 120 may determine at least one feasible operation of the AI device 100, based on information which is determined or generated using a data analysis algorithm or a machine learning algorithm. The control unit 120 may perform an operation determined by controlling constituent elements of the AI device 100. For example, the control unit 120 may request, search, receive, or use data of the learning processor unit 140c or the memory unit 130 and control the constituent elements of the AI device 100 to perform a predicted operation or an operation determined to be preferred among at least one feasible operation. The control unit 120 may collect history information including the operation contents of the AI device 100 and operation feedback by a user and store the collected information in the memory unit 130 or the learning processor unit 140c or transmit the collected information to an external device such as an AI server (400 of FIG. 16). The collected history information may be used to update a learning model.

The memory unit 130 may store data for supporting various functions of the AI device 100. For example, the memory unit 130 may store data obtained from the input unit 140a, data obtained from the communication unit 110, output data of the learning processor unit 140c, and data obtained from the sensor unit 140. The memory unit 130 may store control information and/or software code needed to operate/drive the control unit 120.

The input unit 140a may acquire various types of data from the exterior of the AI device 100. For example, the input unit 140a may acquire learning data for model learning, and input data to which the learning model is to be applied. The input unit 140a may include a camera, a microphone, and/or a user input unit. The output unit 140b may generate output related to a visual, auditory, or tactile sense. The output unit 140b may include a display unit, a speaker, and/or a haptic module. The sensing unit 140 may obtain at least one of internal information of the AI device 100, surrounding environment information of the AI device 100, and user information, using various sensors. The sensor unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit 140c may learn a model consisting of artificial neural networks, using learning data. The learning processor unit 140c may perform AI processing together with the learning processor unit of the AI server (400 of FIG. 16). The learning processor unit 140c may process information received from an external device through the communication unit 110 and/or information stored in the memory unit 130. In addition, an output value of the learning processor unit 140c may be transmitted to the external device through the communication unit 110 and may be stored in the memory unit 130.

INDUSTRIAL AVAILABILITY

The above-described embodiments of the present disclosure are applicable to various mobile communication systems.

The invention claimed is:

1. A method comprising:

transmitting, by a remote user equipment (UE), a first Radio Resource Control (RRC) setup request to a base station;

starting, by the remote UE, a first T300 timer based on the transmission of the first RRC setup request to the base station;

selecting, by the remote UE, a relay UE;

establishing, by the remote UE, PC5 connection with the relay UE;

transmitting, by the remote UE, a second RRC setup request to the base station via the relay UE; and starting, by the remote UE, a second T300 timer for remote UE based on the transmission of the second RRC setup request, wherein each of the first T300 timer and the second T300 timer for remote UE are configured independently by the base station.

2. The method of claim 1, wherein the second T300 timer for remote UE has a larger value than the first T300 timer as a timer expiration value.

3. The method of claim 1, wherein the remote UE stops the second T300 timer for remote UE when receiving a RRCsetup message from the relay UE.

4. The method of claim 1, wherein the remote UE stops the second T300 timer for remote UE when performing relay reselection.

5. The method of claim 1, wherein the remote UE considers RRC connection failure based on not receiving a RRCsetup message until the second T300 timer for remote UE expires from the UE.

6. The method of claim 5, wherein the remote UE resets a MAC related operation related to RRC connection when considering RRC connection failure.

7. A remote user equipment (UE) comprising:

at least one processor; and at least one computer memory operatively connected to the at least one processor and configured to store instructions that when executed causes the at least one processor to perform operations, wherein the operations includes:

transmitting a first Radio Resource Control (RRC) setup request to a base station;

starting a first T300 timer based on the transmission of the first RRC setup request to the base station;

selecting a relay UE;

establishing PC5 connection with the relay UE; and transmitting a second RRC setup request to the base station via the relay UE; and starting, by the remote UE, a second T300 timer for remote UE based on the transmission of the second RRC setup request, wherein each of the first T300 timer and the second T300 timer for remote UE are configured independently by the base station.

8. The remote UE of claim 7, wherein the remote UE communicates with at least one of another UE, a UE related to an autonomous vehicle, a BS, or a network.

9. A processor for performing operations for a relay user equipment (UE) comprising:

transmitting a first Radio Resource Control (RRC) setup request to a base station;

starting a first T300 timer based on the transmission of the first RRC setup request to the base station;

selecting a relay UE;

establishing PC5 connection with the relay UE; and transmitting a second RRC setup request to the base station via the relay UE; and starting a second T300 timer for remote UE based on the transmission of the second RRC setup request, wherein each of the first T300 timer and the second T300 timer for remote UE are configured independently by the base station.

10. A non-transitory computer-readable storage medium for storing at least one computer program including at least one instruction for causing at least one processor to perform operations for a relay user equipment (UE) when being executed by the at least one processor, the operations comprising:

transmitting a first Radio Resource Control (RRC) setup request to a base station;

starting a first T300 timer based on the transmission of the first RRC setup request to the base station;

selecting a relay UE;

establishing PC5 connection with the relay UE; and transmitting a second RRC setup request to the base station via the relay UE; and starting a second T300 timer for remote UE based on the transmission of the second RRC setup request, wherein each of the first T300 timer and the second T300 timer for remote UE are configured independently by the base station.

\* \* \* \* \*